United States Patent
Lee et al.

(10) Patent No.: US 12,517,612 B2
(45) Date of Patent: Jan. 6, 2026

(54) INPUT SENSING PART AND NOISE REDUCTION METHOD OF THE INPUT SENSING PART

(71) Applicant: SAMSUNG DISPLAY CO., LTD., Yongin-si (KR)

(72) Inventors: Seungrok Lee, Yongin-si (KR); Min-Hong Kim, Yongin-si (KR); Jungmok Park, Yongin-si (KR); Bogeun Yuk, Yongin-si (KR); Hyeonseo Cho, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/778,700

(22) Filed: Jul. 19, 2024

(65) Prior Publication Data
US 2025/0199639 A1    Jun. 19, 2025

(30) Foreign Application Priority Data
Dec. 15, 2023   (KR) ........................ 10-2023-0183019

(51) Int. Cl.
*G06F 3/041* (2006.01)
*G06F 3/044* (2006.01)

(52) U.S. Cl.
CPC .......... *G06F 3/0418* (2013.01); *G06F 3/0446* (2019.05)

(58) Field of Classification Search
CPC ... G06F 3/0418; G06F 3/0446; G06F 3/04182
See application file for complete search history.

(56) References Cited

U.S. PATENT DOCUMENTS

| 8,233,737 | B2 * | 7/2012 | Takahashi | H04N 25/677 348/576 |
| 9,223,437 | B2 | 12/2015 | Lee et al. | |
| 12,223,152 | B2 * | 2/2025 | Kim | G06F 3/0445 |
| 2007/0262969 | A1 * | 11/2007 | Pak | G06F 3/0418 345/173 |
| 2015/0103046 | A1 * | 4/2015 | Liu | G06F 3/0412 345/174 |

(Continued)

FOREIGN PATENT DOCUMENTS

KR    10-1378511 B1    3/2014

*Primary Examiner* — Amy Onyekaba
(74) *Attorney, Agent, or Firm* — F. CHAU & ASSOCIATES, LLC

(57) ABSTRACT

A noise reduction method of an input sensing part includes calculating a first calculation value by subtracting a minimum value from a maximum value of values of reception channels, calculating a first average value of first calculation values that exclude a maximum first calculation value, calculating a deviation of the first calculation values from the first average value as third calculation values, detecting a reception channel with a maximum third calculation value as a noise channel, correcting one of a maximum value or a minimum value of the noise channel based on a result of comparing a first value obtained by subtracting an average value of the noise channel from the maximum value of the noise channel, with a second value obtained by subtracting the minimum value of the noise channel from the average value of the noise channel, and subtracting a predetermined value from values of the noise channel.

20 Claims, 20 Drawing Sheets

(56) References Cited

U.S. PATENT DOCUMENTS

| | | | |
|---|---|---|---|
| 2018/0098011 A1* | 4/2018 | Furuta | G01J 1/0295 |
| 2020/0133429 A1* | 4/2020 | Chen | G06F 3/0418 |
| 2023/0325031 A1* | 10/2023 | Kim | G06F 3/0446 |
| | | | 345/173 |

* cited by examiner

| CH | TX34 | TX33 | TX32 | TX31 | TX30 | TX29 | TX28 | TX27 | TX26 | TX25 | TX24 | TX23 | TX22 | TX21 | TX20 | TX19 | TX18 | TX17 | TX16 | TX15 | TX14 | TX13 | TX12 | TX11 | TX10 | TX9 | TX8 | TX7 | TX6 | TX5 | TX4 | TX3 | TX2 | TX1 | TX0 |
|---|---|---|---|---|---|---|---|---|---|---|---|---|---|---|---|---|---|---|---|---|---|---|---|---|---|---|---|---|---|---|---|---|---|---|---|
| RX15 | 4 | -1 | 14 | 4 | 14 | -6 | 7 | 7 | 6 | 2 | 4 | 0 | 5 | -1 | -15 | -9 | 2 | -13 | 7 | 10 | -4 | -7 | -9 | 2 | 3 | -9 | -16 | -16 | -10 | -12 | 4 | 7 | 0 | 5 | 5 |
| RX14 | 0 | -4 | 6 | 9 | -11 | -2 | -16 | -5 | 3 | -1 | -2 | -3 | 8 | 7 | -6 | 7 | 7 | -9 | -10 | 2 | 2 | 1 | 4 | 13 | -6 | 9 | -5 | 0 | -4 | -13 | -7 | 2 | -3 | 3 | -3 |
| RX13 | 8 | -7 | 2 | 4 | -11 | -1 | -4 | 7 | 2 | -5 | -16 | -5 | -3 | -9 | 0 | 8 | 6 | 6 | -5 | 6 | -6 | 5 | 4 | 5 | -7 | -10 | 2 | 2 | 5 | 2 | 3 | 6 | -2 | 15 | 1 |
| RX12 | 13 | 1 | -11 | -8 | -10 | 0 | 9 | -4 | 7 | 3 | 5 | 3 | -21 | -4 | -9 | 3 | -14 | -7 | -9 | -11 | 0 | -2 | -2 | 5 | 9 | 5 | -10 | -2 | 6 | 7 | 1 | -3 | 11 | 4 | 5 |
| RX11 | 11 | -10 | -12 | -5 | -3 | -6 | -8 | -1 | -1 | 2 | 3 | -8 | -19 | -3 | -6 | 6 | 6 | -2 | -7 | -12 | 2 | -5 | -5 | -5 | 2 | 7 | 5 | -1 | 2 | 21 | 12 | 17 | 7 | 10 | 16 |
| RX10 | 4 | 1 | -7 | -4 | 3 | -10 | 2 | -7 | 5 | -1 | 2 | -7 | 6 | -9 | 11 | 10 | 11 | -5 | -2 | -1 | -4 | 5 | 5 | -2 | -2 | -3 | 7 | 1 | -11 | 17 | 7 | 5 | 5 | 2 | -11 |
| RX9 | -4 | 4 | 0 | -7 | -1 | -5 | -7 | 6 | 6 | -1 | -2 | -2 | -1 | -6 | -8 | 11 | -11 | -11 | 1 | -7 | -3 | -1 | 5 | 5 | -6 | -6 | -3 | 9 | 6 | -3 | -2 | 0 | 17 | 4 | -11 |
| RX8 | -9 | 12 | 3 | -7 | 3 | 7 | -11 | -11 | -1 | -6 | 18 | 1 | -5 | -6 | -4 | -8 | 2 | 2 | 9 | -6 | -2 | -1 | 5 | -3 | -8 | 8 | 0 | 2 | 5 | 0 | -9 | -11 | 3 | -7 | 15 |
| RX7 | 9 | -3 | -13 | 3 | 1 | -9 | -17 | -3 | -6 | -1 | 3 | -2 | 0 | 7 | -1 | 2 | 11 | -10 | -16 | 3 | -7 | -12 | -7 | -13 | 2 | -1 | -1 | 6 | 3 | 4 | 0 | 0 | 12 | 11 | 14 |
| RX6 | -4 | -4 | 1 | -1 | 7 | -21 | -17 | -11 | -13 | -3 | -2 | 18 | 0 | -12 | 8 | 11 | 9 | -14 | -1 | -16 | 3 | 9 | 8 | -13 | 2 | 10 | 0 | 6 | 5 | -3 | 3 | 14 | -9 | 11 | 14 |
| RX5 | 6 | -7 | -9 | -6 | 4 | 13 | -2 | -3 | -13 | -1 | -12 | 3 | 5 | 3 | -2 | 10 | 9 | -8 | -5 | 1 | -7 | -8 | -5 | 0 | -13 | 0 | -8 | 9 | 14 | -4 | 11 | 0 | 11 | 7 | -1 |
| RX4 | -17 | 17 | 4 | 6 | 0 | -9 | -19 | -6 | -9 | -4 | -10 | -2 | 5 | -9 | -15 | -4 | 10 | 0 | -5 | -5 | 2 | -5 | 9 | 0 | 26 | -9 | -7 | 6 | 14 | 5 | 2 | -1 | 3 | -1 | 15 |
| RX3 | -1 | 6 | -13 | 7 | 0 | -10 | -6 | 5 | -3 | -3 | 0 | -10 | -5 | -22 | -3 | -16 | -4 | -14 | -8 | -2 | -9 | -5 | 9 | 4 | 6 | -3 | 6 | -8 | 14 | -4 | 3 | 3 | -1 | 13 | 9 |
| RX2 | -3 | -3 | -7 | 7 | 8 | 0 | -6 | 5 | 5 | -3 | 3 | -10 | 3 | -9 | 0 | -14 | 2 | 0 | -5 | -7 | 4 | 3 | -2 | 6 | 5 | 6 | 4 | -3 | 14 | -6 | 3 | 7 | 5 | 15 | 0 |
| RX1 | 2 | 17 | 6 | 12 | 0 | 1 | -10 | 6 | 0 | 5 | 3 | -7 | -7 | 4 | -14 | -7 | -3 | 4 | -2 | -7 | 3 | 4 | -7 | -5 | 6 | 8 | 4 | -9 | -3 | 6 | -1 | 3 | 4 | -7 | 3 |
| RX0 | -8 | 2 | -5 | 4 | -7 | 2 | -10 | 7 | 6 | 5 | -3 | -3 | -5 | 7 | 10 | -6 | -11 | -6 | -7 | 5 | -2 | 4 | 3 | -4 | -2 | -5 | -8 | 0 | 8 | -9 | -7 | 0 | -5 | -10 | 5 |

INPUT SENSING PART AND NOISE REDUCTION METHOD OF THE INPUT SENSING PART

CROSS-REFERENCE TO RELATED APPLICATIONS

This application claims priority under 35 U.S.C. § 119 from Korean Patent Application No. 10-2023-0183019, filed on Dec. 15, 2023 in the Korean Intellectual Property Office, the contents of which are herein incorporated by reference in their entireties.

TECHNICAL FIELD

Embodiments of the present disclosure described herein are directed to an input sensing part and a noise reduction method thereof.

DISCUSSION OF THE RELATED ART

In general, electronic devices that provide images to users, such as smartphones, digital cameras, notebook computers, navigation systems, and smart televisions, include a display device that displays the images. A display device generates an image and provides the users with the generated image through a display screen.

A display device includes a display panel that generates an image, and an input sensing part placed on a display panel that senses an external input. The input sensing part is placed on the display panel to sense the user's touch as an external input. The input sensing part includes a plurality of sensing electrodes that sense the external input, and wires connected to the sensing electrodes.

The sensing electrodes include first sensing electrodes to which driving signals are applied, and second sensing electrodes that cross the first sensing electrodes and that output sensing signals. A change in capacitance of a capacitor formed by the first and second sensing electrodes is output as a sensing signal. The sensing signals output from the second sensing electrodes may include noise that depends on the influence of surrounding signals. Technological developments can reduce noise.

SUMMARY

Embodiments of the present disclosure provide an input sensing part that reduces noise and a noise reduction method thereof.

Embodiments of the present disclosure provide a noise reduction method of reception channels of an input sensing part that includes switching the sign of a maximum or minimum value of a noise channel that has a different sign from other values according to a predetermined standard. As a result, noise in the noise channel can be reduced.

According to an embodiment, a noise reduction method of an input sensing part includes calculating a first calculation value by subtracting a minimum value from a maximum value of sensor values received from a plurality of reception channels that correspond to sensing electrodes of the input sensing part, calculating a first average value of second calculation values defined as those first calculation values those first calculation values of the reception channels that exclude a maximum first calculation value, calculating a deviation of the first calculation values from the first average value as third calculation values, detecting a reception channel with a maximum third calculation value as a noise channel, correcting one of a maximum value or a minimum value of the noise channel based on a result of comparing a first value obtained by subtracting an average value of the noise channel from the maximum value of the noise channel with a second value obtained by subtracting the minimum value of the noise channel from the average value of the noise channel, and removing noise from the noise channel by subtracting a predetermined value from values of the noise channel.

According to an embodiment, a noise reduction method of an input sensing part includes calculating a first calculation value by subtracting a minimum value from a maximum value of values of a plurality of reception channels that correspond to sensing electrodes of the input sensing part, calculating a first average value of those first calculation values s of the reception channels that exclude a maximum first calculation value, calculating a deviation of the first calculation values from the first average value as third calculation values, detecting a reception channel with a maximum third calculation value as a noise channel, comparing a first value obtained by subtracting an average value of the noise channel from a maximum value of the noise channel with a second value obtained by subtracting a minimum value of the noise channel from the average value of the noise channel, switching a sign of the maximum value of the noise channel to an opposite sign when the first value is greater than the second value, switching a sign of the minimum value of the noise channel to an opposite sign when the first value is less than the second value, and subtracting a second average value of the noise channel from the values of the noise channel.

According to an embodiment, an input sensing part includes a first calculation part that calculates a first calculation value by subtracting a minimum value from a maximum value of values of a plurality of reception channels that correspond to sensing electrodes of the input sensing part, a second calculation part that calculates a first average value from those first average values of the reception channels that exclude a maximum first calculation value, a third calculation part that calculates a deviation of the first calculation values of the reception channels from the first average value as third calculation values, a noise channel detection part that detects a reception channel that corresponds to a maximum third calculation value as a noise channel, a correction part that corrects one of a maximum value or a minimum value of the noise channel based on a result of comparing a first value obtained by subtracting the first average value from the maximum value of the noise channel with a second value obtained by subtracting the minimum value of the noise channel from the first average value, and a noise reduction part that subtracts a second average value of values of the noise channel from the values of the noise channel.

BRIEF DESCRIPTION OF THE FIGURES

FIG. 11 is a table of values of reception channels for transmission channels, according to an embodiment of the present disclosure.

FIG. 15 is a table of values in a state in which a sign of a maximum value of the noise channel in FIG. 11 is switched.

FIG. 18 is a table of values of reception channels converted depending on a noise reduction operation, according to an embodiment of the present disclosure.

FIG. 19 is a table of values of reception channels when operation S600 is performed without the above-described operations S100 to S500.

FIG. 20 is a table of values of reception channels for transmission channels, according to an embodiment of the present disclosure.

FIG. 21 is a table of values in a state where a sign of a minimum value of a noise channel in FIG. 20 is converted.

FIG. 22 is a table of values of reception channels converted depending on a noise reduction operation in FIG. 20.

DETAILED DESCRIPTION

Figure 1:
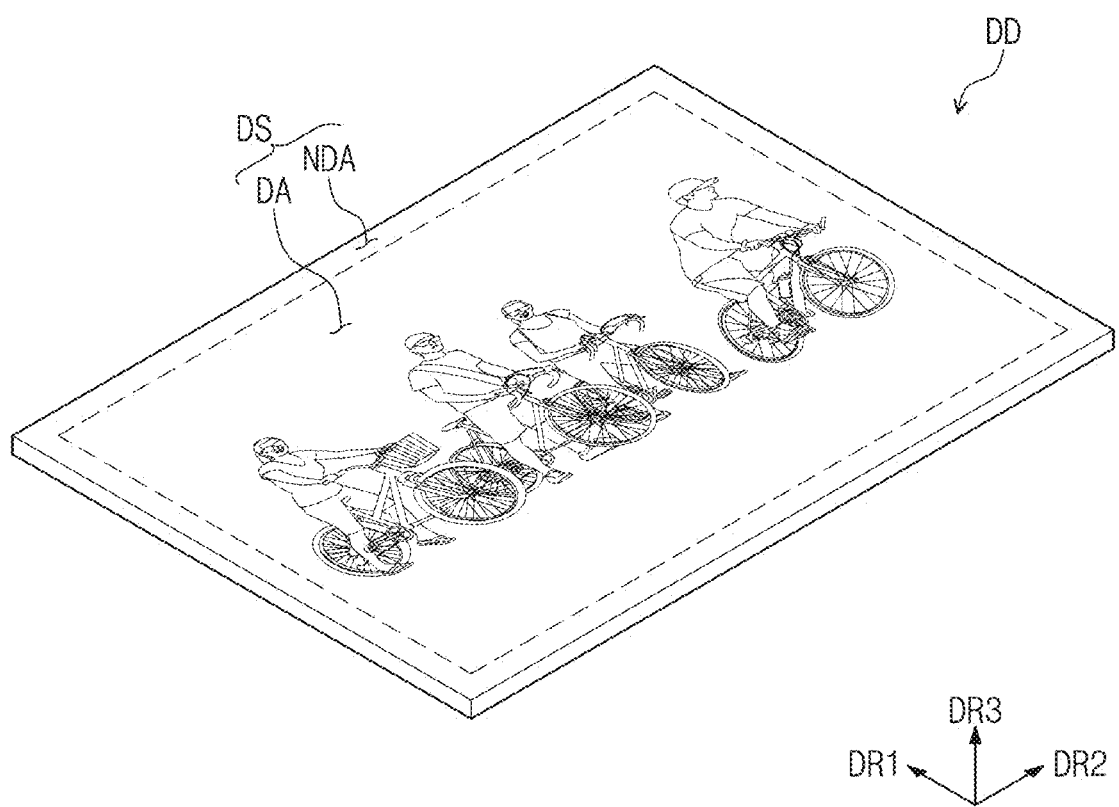
FIG. 1 is a perspective view of a display device, according to an embodiment of the present disclosure.

In the specification, when one component, area, layer, part, etc., is referred to as being "on", "connected to", or "coupled to" another component, it should be understood that the former may be directly on, connected to, or coupled to the latter, and also may be on, connected to, or coupled to the latter via a third intervening component.

Like reference numerals may refer to like components.

Hereinafter, embodiments of the present disclosure will be described with reference to accompanying drawings.

FIG. 1 is a perspective view of a display device, according to an embodiment of the present disclosure.

Referring to FIG. 1, in an embodiment, a display device DD has a plane defined by a first direction DR1 and a second direction DR2 that intersect each other. The display device DD has a rectangular shape that has short sides in the first direction DR1 and long sides in the second direction DR2. However, embodiments are not necessarily limited thereto, and the display device DD can have various other shapes, such as a circle or a polygon, in other embodiments.

A direction that intersects a plane defined by the first and second directions DR1 and DR2 may be defined as a third direction DR3. In the specification, the meaning of "when viewed in a plan view" means "when viewed in the third direction DR3".

An upper surface of the display device DD is a display surface DS. An image generated by the display device DD is provided to a user through the display surface DS. The display surface DS includes a display area DA and a non-display area NDA around the display area DA. The display area DA displays an image, and the non-display area NDA does not display an image. The non-display area NDA may surround the display area DA and defines a border of the display device DD printed in a predetermined color.

The display device DD can be used for a large electronic device such as a television, a monitor, or an outer billboard. Moreover, the display device DD can be used for a small and medium electronic device such as a personal computer, a notebook computer, a personal digital terminal, an automotive navigation system, a game console, a smartphone, a tablet, or a camera. However, embodiments are not necessarily limited thereto, and in other embodiments, the display device DD can be incorporated into any other electronic device(s) without departing from the concept of the present disclosure.

Figure 2:
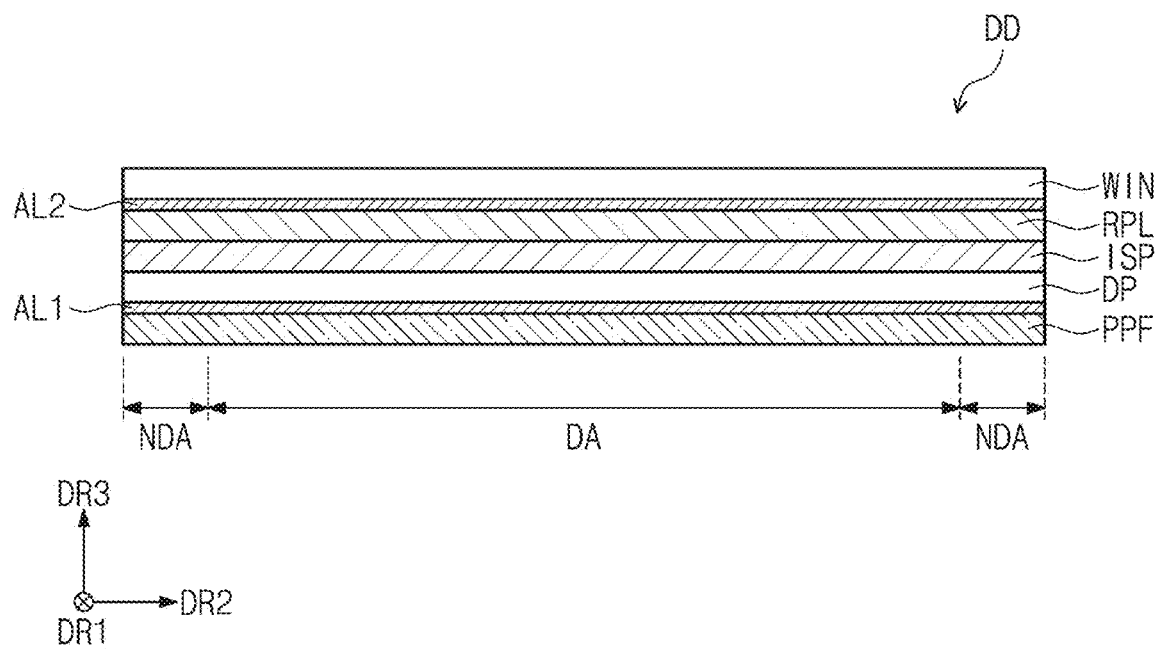
FIG. 2 is a cross-sectional view of a display device shown in FIG. 1.

FIG. 2 is a cross-sectional view of a display device shown in FIG. 1.

FIG. 2 is a cross-sectional view of the display device DD when viewed in the first direction DR1.

Referring to FIG. 2, in an embodiment, the display device DD includes a display panel DP, an input sensing part ISP, an anti-reflection layer RPL, a window WIN, a panel protection film PPF, and first and second adhesive layers AL1 and AL2.

According to an embodiment of the present disclosure, the display panel DP includes a light emitting display panel. For example, the display panel DP is one of an organic light emitting display panel or an inorganic light emitting display panel. A light emitting layer of an organic light emitting display panel includes an organic light emitting material. A light emitting layer of an inorganic light emitting display panel includes a quantum dot, a quantum rod, etc. Hereinafter, for convenience of explanation and without limitation, the display panel DP will be described as an organic light emitting display panel.

The input sensing part ISP is disposed on the display panel DP. The input sensing part ISP includes a plurality of sensing electrodes that capacitively sense an external input. In some embodiments, when the display device DD is manufactured, the input sensing part ISP is directly manufactured on the display panel DP. However, embodiments are not necessarily limited thereto, and other embodiments, the input sensing part ISP is manufactured as a separate panel from the display panel DP and attached to the display panel DP by an adhesive layer.

The anti-reflection layer RPL is disposed on the input sensing part ISP. In some embodiments, when the display device DD is manufactured, the anti-reflection layer RPL is directly manufactured on the input sensing part ISP. However, embodiments are not necessarily limited thereto, and in other embodiments, the anti-reflection layer RPL is manufactured as a separate panel and attached to the input sensing part ISP by an adhesive layer.

The anti-reflection layer RPL is an external light anti-reflection film. The anti-reflection layer RPL reduces the reflectance of external light incident from a top surface of the display device DD toward the display panel DP. The external light is not perceived to a user by the anti-reflection layer RPL.

When external light directed toward the display panel DP is reflected from the display panel DP and to an external user, the user can visually perceive the external light, like a mirror. To prevent this phenomenon, the anti-reflection layer RPL includes a plurality of color filters that display the same color as the pixels of the display panel DP.

The color filters filter the external light to be the same color as the pixels. For example, the external light is not perceived by the user. However, embodiments are not necessarily limited thereto, and in other embodiments, the anti-reflection layer RPL includes a phase retarder and/or a polarizer to reduce the reflectance of external light.

The window WIN is disposed on the anti-reflection layer RPL. The window WIN protects the display panel DP, the input sensing part ISP, and the anti-reflection layer RPL from external scratches and impacts.

The panel protection film PPF is disposed under the display panel DP. The panel protection film PPF protects a bottom surface of the display panel DP. The panel protection film PPF includes a plastic material such as Polyethyleneterephthalate (PET).

The first adhesive layer AL1 is interposed between the display panel DP and the panel protection film PPF, and the display panel DP and the panel protection film PPF are bonded to each other by the first adhesive layer AL1. The second adhesive layer AL2 is interposed between the window WIN and the anti-reflection layer RPL, and the window WIN and the anti-reflection layer RPL are bonded to each other by the second adhesive layer AL2.

Figure 3:
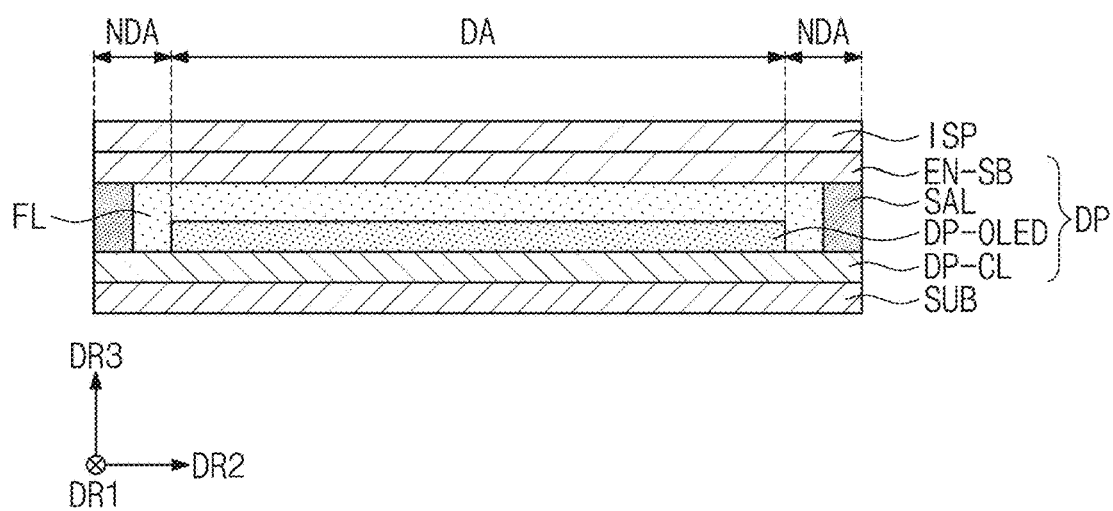
FIG. 3 is a cross-sectional view of a display panel shown in FIG. 2.

FIG. 3 is a cross-sectional view of a display panel shown in FIG. 2.

For example, FIG. 3 is a cross sectional view of the display panel DP when viewed in the first direction DR1, and shows the input sensing part ISP together with the display panel DP.

Referring to FIG. 3, in an embodiment, the display panel DP includes a substrate SUB, a circuit element layer DP-CL, a display element layer DP-OLED, an encapsulation substrate EN-SB, a sealing layer SAL, and a filler FL. The circuit element layer DP-CL is disposed on the substrate SUB. The display element layer DP-OLED is disposed on the circuit element layer DP-CL.

A plurality of pixels are disposed on the circuit element layer DP-CL and the display element layer DP-OLED. Each of the pixels includes a transistor disposed on the circuit element layer DP-CL and a light emitting element disposed on the display element layer DP-OLED and connected to the transistor.

The substrate SUB includes the display area DA and the non-display area NDA around the display area DA. The display element layer DP-OLED is disposed in the display area DA. The encapsulation substrate EN-SB is disposed on the display element layer DP-OLED. Each of the substrate SUB and the encapsulation substrate EN-SB is rigid. Accordingly, the display panel DP is rigid.

The sealing layer SAL is interposed between the substrate SUB and the encapsulation substrate EN-SB. The sealing layer SAL is disposed on the non-display area NDA. The sealing layer SAL bonds the substrate SUB and the encapsulation substrate EN-SB. The display element layer DP-OLED is sealed between the substrate SUB and the encapsulation substrate EN-SB by the sealing layer SAL.

The filler FL is interposed between the substrate SUB and the encapsulation substrate EN-SB. The filler FL is placed in a space sealed by the sealing layer SAL between the substrate SUB and the encapsulation substrate EN-SB. Each of the sealing layer SAL and the filler FL includes a thermosetting material.

The input sensing part ISP is directly disposed on the display panel DP. For example, the input sensing part ISP is disposed directly on the encapsulation substrate EN-SB.

Figure 4:
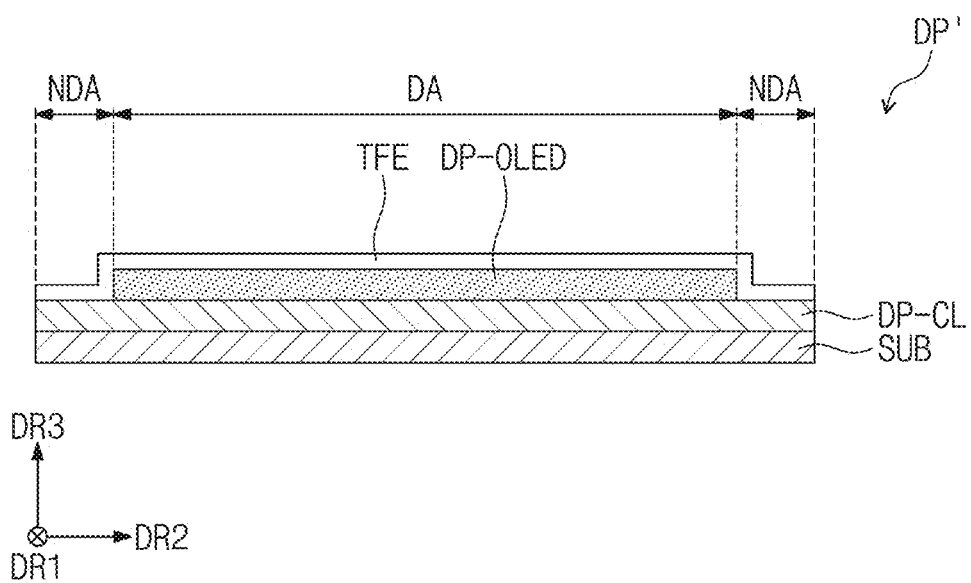
FIG. 4 is a cross sectional view of a display panel according to an embodiment of the present disclosure.

FIG. 4 is a cross sectional view of a display panel according to an embodiment of the present disclosure.

Referring to FIG. 4, in an embodiment, a display panel DP' includes the circuit element layer DP-CL disposed on the substrate SUB, the display element layer DP-OLED disposed on the circuit element layer DP-CL, and a thin film encapsulation layer TFE disposed on the display element layer DP-OLED.

The display panel DP' is a flexible display panel. For example, the substrate SUB includes a flexible plastic material such as polyimide. A disposition structure of the circuit element layer DP-CL and the display element layer DP-OLED is the same as that of the circuit element layer DP-CL and the display element layer DP-OLED shown in FIG. 3.

The thin film encapsulation layer TFE is disposed on the circuit element layer DP-CL and covers the display element layer DP-OLED. The thin film encapsulation layer TFE includes inorganic layers and an organic layer between the inorganic layers. The inorganic layers protect pixels from moisture/oxygen. The organic layer protects the pixels from foreign substances such as dust particles. In addition, the input sensing part ISP shown in FIG. 2 is directly disposed on the thin film encapsulation layer TFE.

Figure 5:
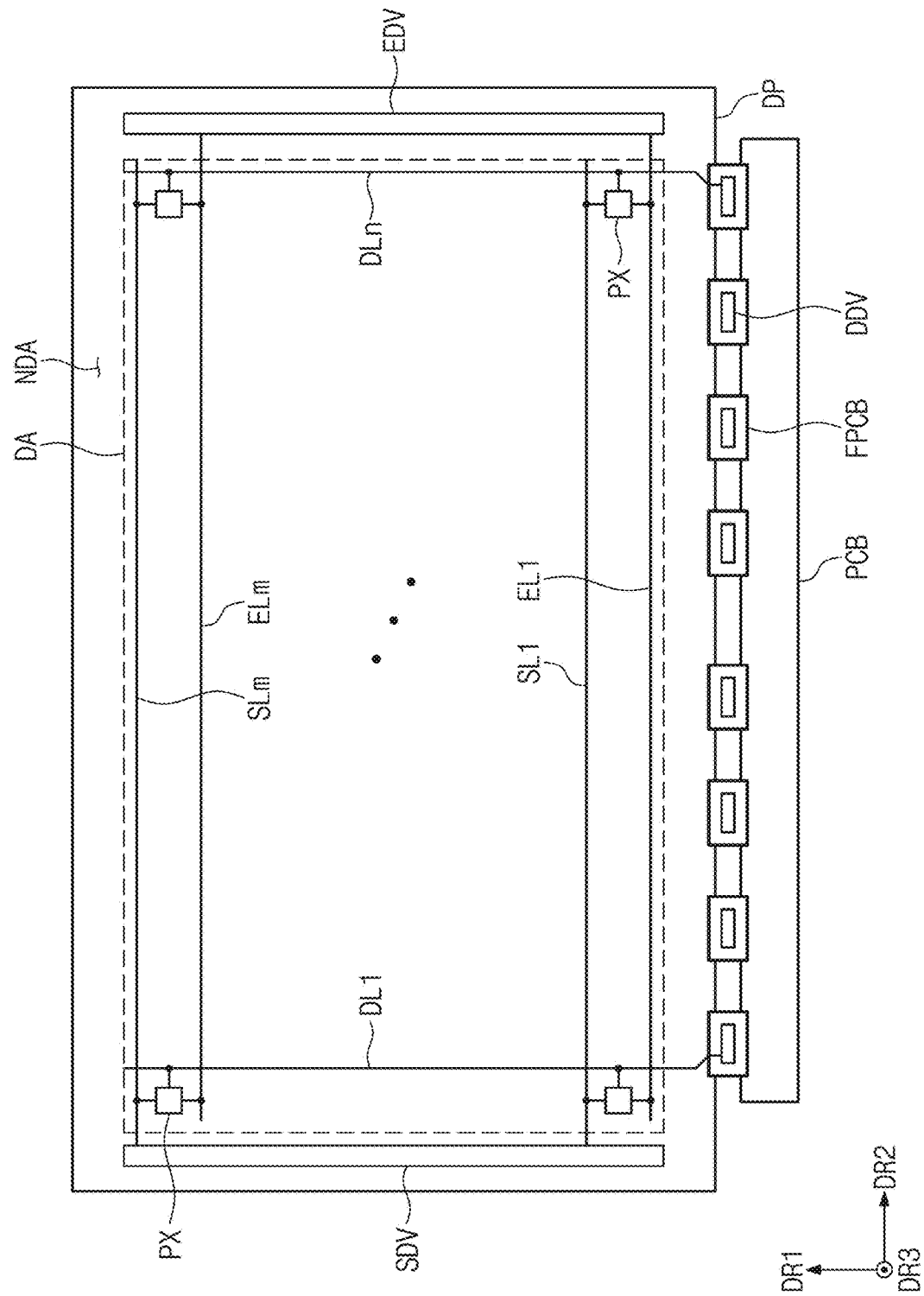
FIG. 5 is a plan view of a display panel shown in FIG. 2.

FIG. 5 is a plan view of a display panel shown in FIG. 2.

Referring to FIG. 5, in an embodiment, the display device DD includes the display panel DP, a scan driver SDV, a plurality of data drivers DDV, a plurality of flexible printed circuit boards FPCB, an emission driver EDV, and a printed circuit board PCB.

The display panel DP includes the display area DA and the non-display area NDA that surrounds the display area DA. The display area DA and the non-display area NDA of the display panel DP respectively correspond to the display area DA and the non-display area NDA shown in FIG. 2. The display panel DP has a rectangular shape that has long sides that extend in the second direction DR2 and short sides that extend in the first direction DR1. However, the shape of the display panel DP is not necessarily limited thereto.

The display panel DP includes a plurality of pixels PX, a plurality of scan lines SL1 to SLm, a plurality of data lines DL1 to DLn, and a plurality of emission lines EL1 to ELm. Each of 'm' and 'n' is a natural number.

The pixels PX are disposed in the display area DA. The scan driver SDV and the emission driver EDV are disposed in the non-display area NDA adjacent to the short sides of the display panel DP.

When viewed in a plan view, the data drivers DDV are adjacent to a lower side of the display panel DP, which is one of the long sides of the display panel DP. When viewed in a plan view, the printed circuit board PCB is adjacent to the lower side of the display panel DP. The flexible printed circuit board FPCB is connected between the lower side of the display panel DP and the printed circuit board PCB. The data drivers DDV are integrated circuit chips and are mounted on the flexible printed circuit boards FPCB.

The scan lines SL1 to SLm extend in the second direction DR2 and are connected to the pixels PX and the scan driver SDV. The emission lines EL1 to ELm extend in the second direction DR2 and are connected to pixels PX and the emission driver EDV.

The data lines DL1 to DLn extend in the first direction DR1 and are connected to the pixels PX and the data drivers DDV. For example, the two data lines DL1 and DLn respectively placed on the leftmost and rightmost sides and connected to the data drivers DDV are shown. However, a plurality of data lines may be connected to each of the data drivers DDV.

In addition, the display device DD may further include a timing controller that controls operations of the scan driver SDV, the data drivers DDV, and the emission driver EDV. The timing controller is an integrated circuit chip and mounted on the printed circuit board PCB. The timing controller is connected to the data drivers DDV, the scan driver SDV, and the emission driver EDV through the printed circuit board PCB and the flexible printed circuit board FPCB.

The scan driver SDV generates a plurality of scan signals. The scan signals are transmitted to the pixels PX through the scan lines SL1 to SLm. The data drivers DDV generate a plurality of data voltages. The data voltages are transmitted to the pixels PX through the data lines DL1 to DLn. The emission driver EDV generates a plurality of emission signals. The emission signals are transmitted to the pixels PX through the emission lines EL1 to ELm.

The pixels PX receive the data voltages in response to the scan signals. The pixels PX display an image by emitting light whose luminance corresponds to the data voltages in response to the emission signals. The emission time of the pixels PX is controlled by the emission signals.

Figure 6:
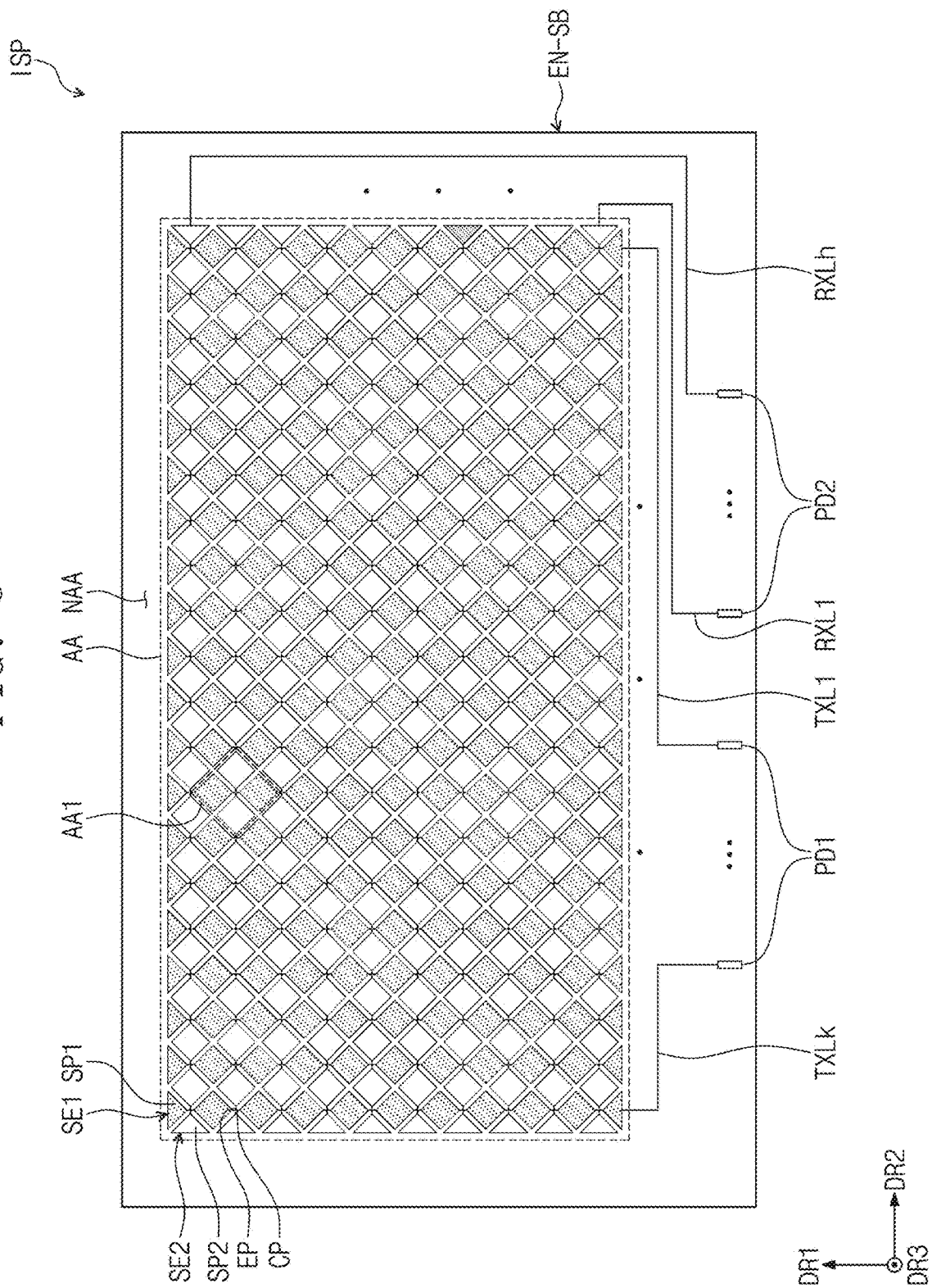
FIG. 6 is a plan view of a input sensing part shown in FIG. 2.

FIG. 6 is a plan view of an input sensing part shown in FIG. 2.

Referring to FIG. 6, in an embodiment, the input sensing part ISP includes a plurality of first and second sensing electrodes SE1 and SE2, a plurality of wires TXL1 to TXLk and RXL1 to RXLh, a plurality of first pads PD1, and a plurality of second pads PD2. The sensing electrodes SE1 and SE2, the wires TXL1 to TXLk and RXL1 to RXLh, and the first and second pads PD1 and PD2 are disposed on the encapsulation substrate EN-SB.

The planar area of the input sensing part ISP includes an active area AA and an inactive area NAA around the active area AA. The active area AA overlaps the display area DA. The inactive area NAA overlaps the non-display area NDA.

The first and second sensing electrodes SE1 and SE2 are disposed in the active area AA. The first and second pads PD1 and PD2 are disposed in the inactive area NAA. When viewed in a plan view, the first pads PD1 and the second pads PD2 are adjacent to the lower end of the input sensing part ISP.

The wires TXL1 to TXLk and RXL1 to RXLh are connected to ends of the first and second sensing electrodes SE1 and SE2, and extend to the inactive area NAA and are connected to the first and second pads PD1 and PD2. The input sensing part ISP further includes a sensing controller, shown in FIG. 7. The sensing controller is connected to the first and second pads PD1 and PD2 through a printed circuit board.

The first and second sensing electrodes SE1 and SE2 include the plurality of first sensing electrodes SE1 that are spaced apart in the second direction DR2 and extend in the first direction DR1, and the plurality of second sensing electrodes SE2 that are spaced in the first direction DR1 and extend in the second direction DR2. The second sensing electrodes SE2 are insulated from the first sensing electrodes SE1 and cross with the first sensing electrodes SE1. The first sensing electrodes SE1 may be defined as driving electrodes, and the second sensing electrodes SE2 may be defined as sensing electrodes.

The wires TXL1 to TXLk and RXL1 to RXLh include the plurality of first wires TXL1 to TXLk connected to the first sensing electrodes SE1, and the plurality of second wires RXL1 to RXLh connected to the second sensing electrodes SE2. Each of 'h' and 'k' is a natural number. The first wires TXL1 to TXLk extend to the inactive area NAA and are connected to the first pads PD1. The second wires RXL1 to RXLh extend to the inactive area NAA and are connected to the second pads PD2.

For example, when viewed in a plan view, the first wires TXL1 to TXLk are disposed in the inactive area NAA adjacent to the lower side of the active area AA. When viewed in a plan view, the second wires RXL1 to RXLh are disposed in the inactive area NAA adjacent to the right side of the active area AA. The first wires TXL1 to TXLk may be defined as transmission wires. The second wires RXL1 to RXLh may be defined as sensing wires.

Each of the first sensing electrodes SE1 includes a plurality of first sensing parts SP1 that extend in the first direction DR1, and a plurality of connection patterns CP that connect the first sensing parts SP1. Each of the connecting patterns CP is interposed between two first sensing parts SP1 that are adjacent to each other in the first direction DR1 and connect the two first sensing parts SP1.

Each of the second sensing electrodes SE2 include a plurality of second sensing parts SP2 that extend in the second direction DR2, and a plurality of extension patterns EP that extend from the second sensing parts SP2. Each of the extension patterns EP is disposed between two second sensing parts SP2 that are adjacent to each other in the second direction DR2, and connect the two second sensing parts SP2.

The first sensing parts SP1 and the second sensing parts SP2 do not overlap each other, are spaced from each other, and are alternately placed with each other. Capacitances are formed by the first sensing parts SP1 and the second sensing parts SP2.

Figure 7:
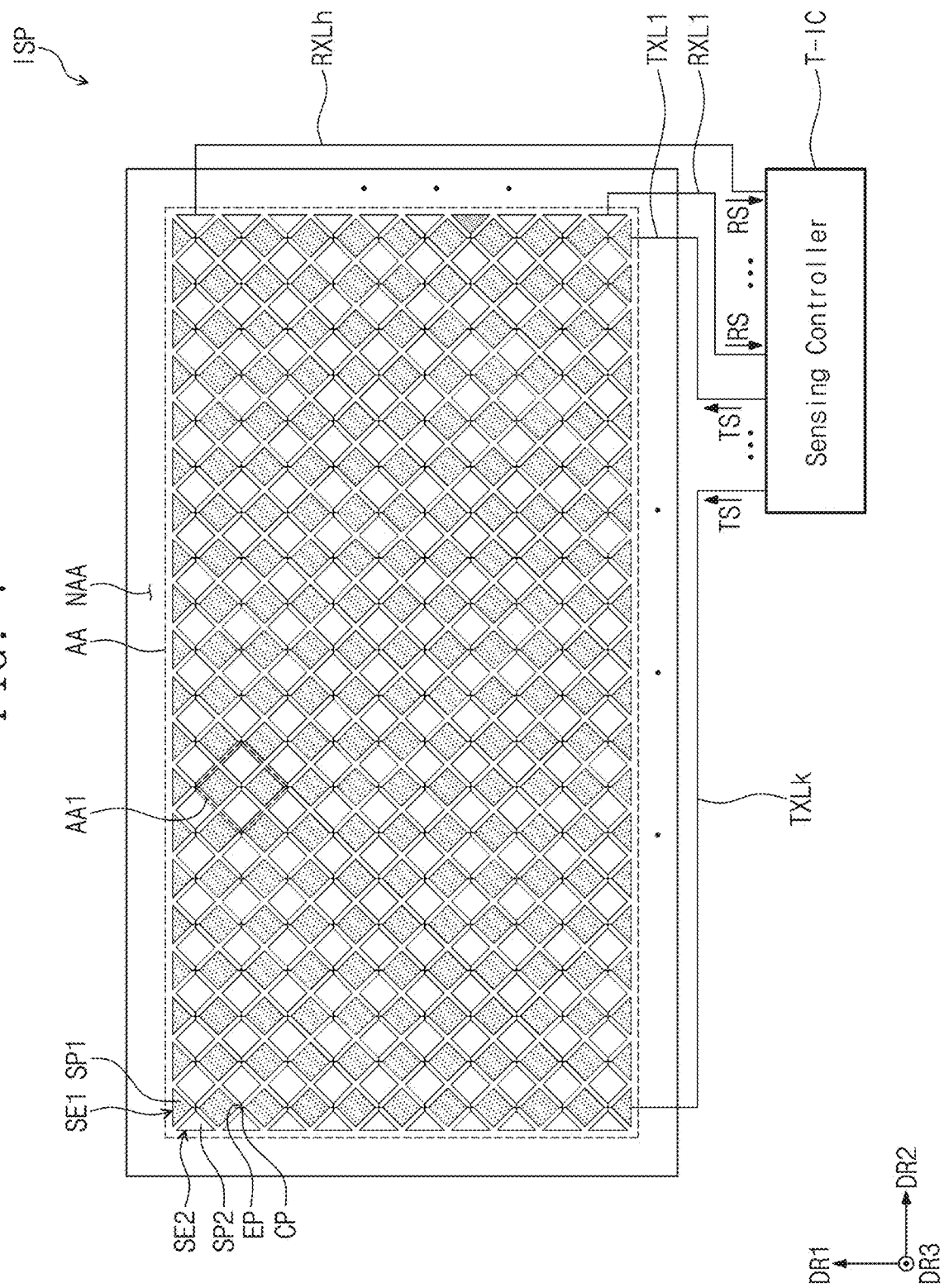
FIG. 7 is a plan view that illustrates an operation of an input sensing part shown in FIG. 6.

FIG. 7 is a plan view that illustrates an operation of a input sensing part shown in FIG. 6.

For example, FIG. 7 shows a reduced size inactive area NAA as compared to an embodiment of FIG. 6, and the first and second wires TXL1 to TXLk and RXL1 to RXLh extend outside of the input sensing part ISP and are connected to a sensing controller T-IC.

Referring to FIGS. 6 and 7, in an embodiment, the input sensing part ISP includes the sensing controller T-IC. The first wires TXL1 to TXLk and the second wires RXL1 to RXLh are connected to the sensing controller T-IC. For example, the first wires TXL1 to TXLk and the second wires RXL1 to RXLh are connected to the sensing controller T-IC through the first and second pads PD1 and PD2 described above.

The sensing controller T-IC generates driving signals TS and transmits the driving signals TS to the first wires TXL1 to TXLk. The driving signals TS are transmitted to the first sensing electrodes SE1 through the first wires TXL1 to TXLk.

A user's touch can be sensed by the first and second sensing electrodes SE1 and SE2. Sensing signals RS output from the second sensing electrodes SE2 are transmitted through the second wires RXL1 to RXLh to the sensing controller T-IC. A change in capacitance of a capacitor formed by the first and second sensing electrodes SE1 and S2 is output as a sensing signal RS. The sensing controller T-IC generates the coordinates of a user's touch location by using the sensing signals RS.

Figure 8:
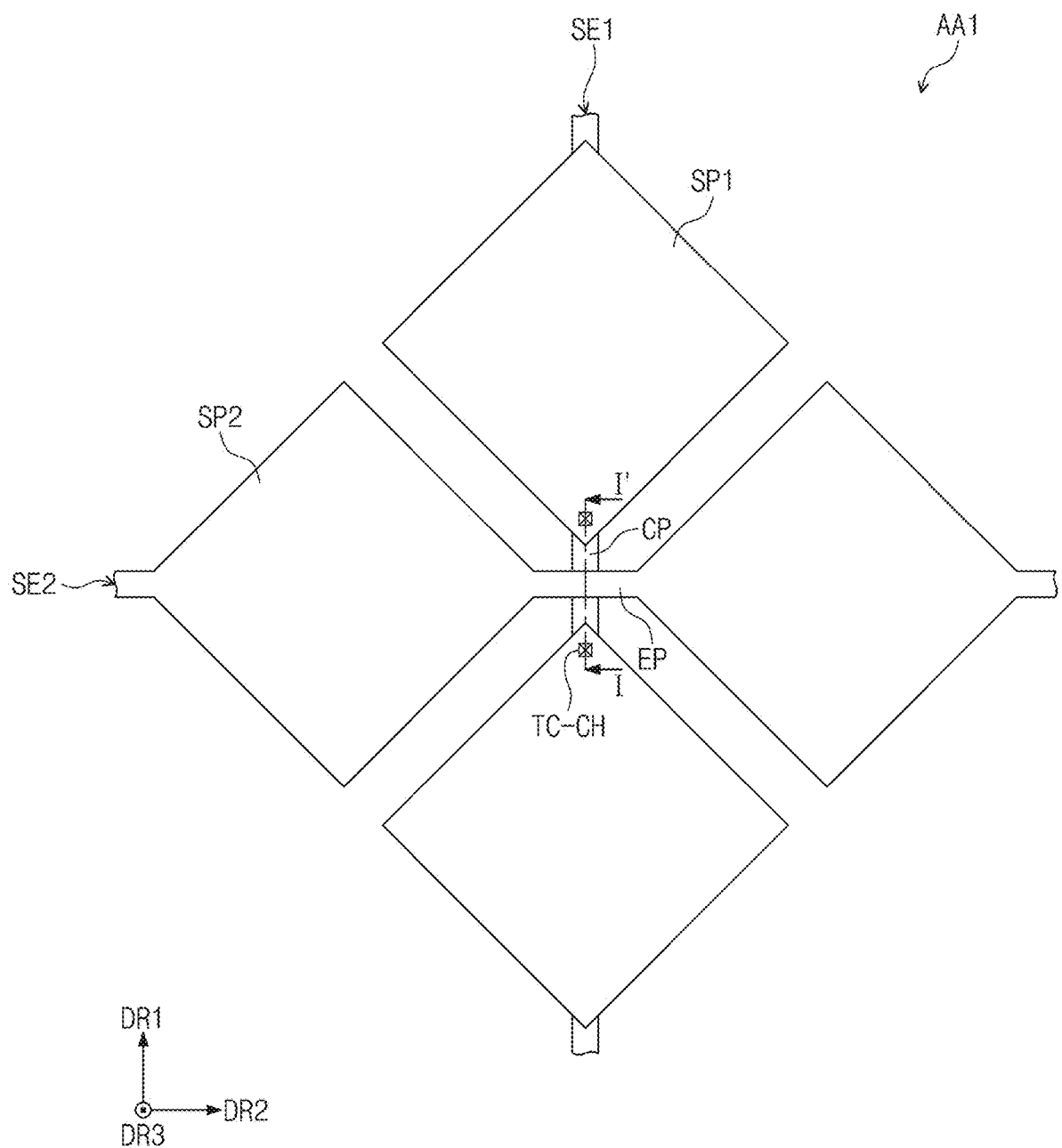
FIG. 8 is an enlarged view of area AA1 illustrated in FIG. 7.

FIG. 8 is an enlarged view of area AA1 illustrated in FIG. 7.

Figure 9:
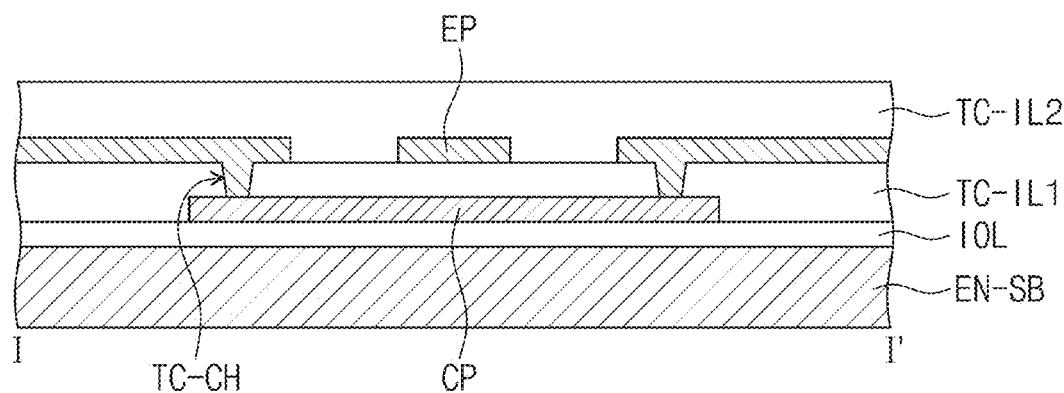
FIG. 9 is a cross-sectional view taken along line I-I' in FIG. 8.

Referring to FIG. 8, in an embodiment, the first sensing electrode SE1 includes a pair of first sensing parts SP1 that are adjacent to each other in the first direction DR1, and the connection pattern CP disposed between the first sensing parts SP1 that connect the first sensing parts SP1. An insulating layer, shown in FIG. 9, is disposed between the connection pattern CP and the first sensing parts SP1. The connection pattern CP are connected to the first sensing parts SP1 through contact holes TC-CH defined in the insulating layer.

The second sensing electrode SE2 include a pair of second sensing parts SP2 that are adjacent to each other in the second direction DR2, and an extension pattern EP disposed between the second sensing parts SP2 and that connects the second sensing parts SP2. The extension pattern EP is insulated from the connection pattern CP and crosses the connection pattern CP. The extension pattern EP is integrally formed with the second sensing parts SP2.

The first and second sensing parts SP1 and SP2 are extension pattern EP are disposed in the same layer. The connection pattern CP is disposed in a different layer from the first and second sensing parts SP1 and SP2 and the extension pattern EP.

FIG. 9 is a cross-sectional view taken along line I-I' in FIG. 8.

Referring to FIGS. 8 and 9, in an embodiment, an insulating layer IOL is disposed on the encapsulation substrate EN-SB. The connection pattern CP is disposed on the insulating layer IOL. A first insulating layer TC-IL1 is disposed on the connection pattern CP and the insulating layer IOL. The first insulating layer TC-IL1 covers the connection pattern CP.

The first sensing parts SP1 and the extension pattern EP are disposed on the first insulating layer TC-IL1. In addition, the second sensing parts SP2 are disposed on the same layer as the extension pattern EP and are disposed on the first insulating layer TC-IL1.

The first sensing parts SP1 are connected to the connection pattern CP through the contact holes TC-CH formed in the first insulating layer TC-IL1. Accordingly, the first sensing parts SP1 are connected to each other by the connection pattern CP.

A second insulating layer TC-IL2 is disposed on the first insulating layer TC-IL1, the first sensing parts SP1 and the extension pattern EP. The second insulating layer TC-IL2 covers the first sensing parts SP1 and the extension pattern EP. In addition, the second insulating layer TC-IL2 covers the second sensing parts SP2.

Figure 10:
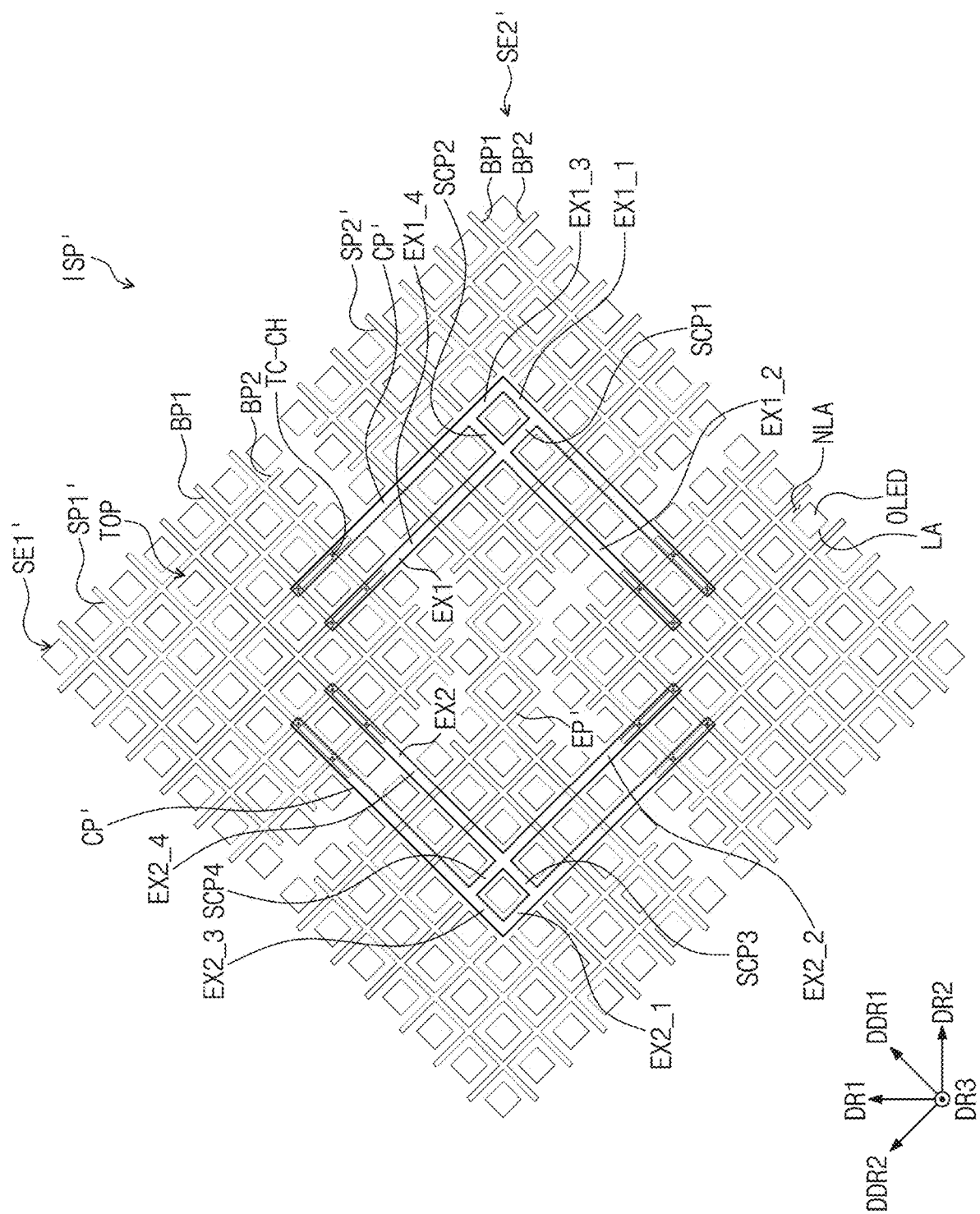
FIG. 10 illustrates a configuration of an input sensing part, according to an embodiment of the present disclosure.

FIG. 10 illustrates a configuration of an input sensing part, according to an embodiment of the present disclosure.

For example, FIG. 10 shows an enlarged plan view that corresponds to FIG. 8.

Referring to FIG. 10, in an embodiment, an input sensing part ISP' includes a plurality of configurations. For example, the planar configuration of the input sensing part ISP' shown in FIG. 10 are substantially the same as the input sensing part ISP shown in FIG. 6.

The input sensing part ISP' included first and second sensing electrodes SE1' and SE2'. The first and second sensing electrodes SE1' and SE2' are disposed on the thin film encapsulation layer TFE shown in FIG. 4.

The first sensing electrode SE1' includes first sensing parts SP1' and a connection pattern CP' disposed between the first sensing parts SP1'. The second sensing electrode SE2' includes a second sensing part SP2' and an extension pattern EP' disposed between the second sensing parts SP2'.

The first sensing parts SP1' and the second sensing parts SP2' each have a mesh shape. To have a mesh shape, each of the first and second sensing parts SP1' and SP2' include a plurality of first branch parts BP1 that extend in a first diagonal direction DDR1, and a plurality of second branch parts BP2 that extend in a second diagonal direction DDR2.

The first diagonal direction DDR1 is a direction that intersects the first and second directions DR1 and DR2 in a plane defined by the first and second directions DR1 and DR2. The second diagonal direction DDR2 is a direction that intersects the first diagonal direction DDR1 in a plane defined by the first and second directions DR1 and DR2. For example, the first direction DR1 and the second direction DR2 are perpendicular to each other. The first diagonal direction DDR1 and the second diagonal direction DDR2 are perpendicular to each other.

First branch parts BP1 of each of the first and second sensing parts SP1' and SP2' intersect second branch parts BP2 of each of the first and second sensing parts SP1' and SP2', and are integrally formed with each other. Rhombus-shaped touch openings TOP are formed by the first branch parts BP1 and the second branch parts BP2.

When viewed in a plan view, emission areas LA are located within the touch openings TOP. The light emitting elements of the pixels PX are placed in the emission areas LA. Light is emitted from light emitting elements through the emission areas LA. The emission areas LA are surrounded by non-emission area NLA in the touch openings TOP.

The first and second sensing parts SP1' and SP2' are placed in the non-emission area NLA. Because the first and second sensing parts SP1' and SP2' are placed in the non-emission area NLA, the light can be emitted through the emission areas LA without being affected by the first and second sensing parts SP1' and SP2'.

The connecting pattern CP' extend toward the first sensing parts SP1' via the second sensing parts SP2'. The connecting pattern CP' do not overlap the extension pattern EP', and thus the connecting pattern CP' connect the first sensing parts SP1'. The connecting pattern CP' are connected to the first sensing parts SP1' through the plurality of contact holes TC-CH.

The connection pattern CP' are disposed on the same layer as the connection pattern CP described above. The extension pattern EP', the first sensing parts SP1', and the second sensing parts SP2' are disposed on the same layer as the extension pattern EP, the first sensing parts SP1, and the second sensing parts SP2 described above. Accordingly, the contact holes TC-CH are formed in the first insulating layer TC-IL1 between the connection pattern CP' and the first sensing parts SP1'.

The extension pattern EP' is interposed between the first sensing parts SP1' and extends from the second sensing parts SP2'. The second sensing parts SP2' and the extension pattern EP' are integrally formed with each other. The extension pattern EP' has a mesh shape. When viewed in a plan view, the extension pattern EP' do not overlap the connection pattern CP'.

The connecting pattern CP' includes a first extension part EX1 and a second extension part EX2 that has a shape symmetrical to that of the first extension part EX1. The extension pattern EP' is placed between the first extension part EX1 and the second extension part EX2.

The first extension part EX1 overlaps one of the second sensing parts SP2' and is connected to the first sensing parts SP1'. The second extension part EX2 overlaps another second sensing part SP2' and is connected to the first sensing parts SP1'.

Hereinafter, the first sensing parts SP1' are defined as first upper sensing part SP1' and first lower sensing part SP1', depending on a relative placement location. In addition, the second sensing parts SP2' are defined as a second left sensing part SP2' and a second right sensing part SP2', depending on a relative placement location.

Predetermined portions of the first and second extension parts EX1 and EX2 adjacent to sides of the first and second extension parts EX1 and EX2 are connected to the first lower sensing part SP1' through the plurality of contact holes TC-CH. Predetermined portions of the first and second extension parts EX1 and EX2 adjacent to the other sides of the first and second extension parts EX1 and EX2 are connected to the first upper sensing part SP1' through the plurality of contact holes TC-CH.

The first extension part EX1 include a first sub-extension part EX1_1 and a second sub-extension part EX1_2 that extend in the first diagonal direction DDR1, a third sub-extension part EX1_3 and a fourth sub-extension part EX1_4 that extends in the second diagonal direction DDR2, a first sub-conductive pattern SCP1 that extends in the second diagonal direction DDR2, and a second sub-conductive pattern SCP2 that extends in the first diagonal direction DDR1.

Predetermined portions of the first and second sub-extension parts EX1_1 and EX1_2 adjacent to first sides of the first and second sub-extension parts EX1_1 and EX1_2 are connected to the first lower sensing part SP1' through the plurality of contact holes TC-CH. Predetermined portions of the third and fourth sub-extension parts EX1_3 and EX1_4 adjacent to first sides of the third and fourth sub-extension parts EX1_3 and EX1_4 are connected to the first upper sensing part SP1' through the plurality of contact holes TC-CH.

A second side of the first sub-extension part EX1_1 extends from the other side of the third sub-extension part EX1_3. A second side of the second sub-extension part EX1_2 extends from the other side of the fourth sub-extension part EX1_4. The first sub-conductive pattern SCP1 extends in the second diagonal direction DDR2 from the second side of the fourth sub-extension part EX1_4, and extends to the first sub-extension part EX1_1. The second sub-conductive pattern SCP2 extends in the first diagonal direction DDR1 from the second side of the second sub-extension part EX1_2, and extends to the third sub-extension part EX1_3.

The first sub-extension part EX1_1, the second sub-extension part EX1_2, the third sub-extension part EX1_3, the fourth sub-extension part EX1_4, the first sub-conductive pattern SCP1, and the second sub-conductive pattern SCP2 are integrally formed with each other.

The first and second sub-extension parts EX1_1 and EX1_2 intersect a predetermined number of the second branch parts BP2 of the second right sensing part SP2' that are adjacent to the first lower sensing part SP1'. The first branch parts BP1 of the second right sensing part SP2' are not disposed in those areas that overlap the first and second sub-extension parts EX1_1 and EX1_2 and the second sub-conductive pattern SCP2.

The third and fourth sub-extension parts EX1_3 and EX1_4 intersect a predetermined number of the first branch parts BP1 of the second right sensing part SP2' that are adjacent to the first upper sensing part SP1'. The second branch parts BP2 of the second right sensing part SP2' are not disposed in those areas that overlap the third and fourth sub-extension parts EX1_3 and EX1_4 and the first sub-conductive pattern SCP1.

The second extension part EX2 includes a fifth sub-extension part EX2_1 and a sixth sub-extension part EX2_2 that extend in the second diagonal direction DDR2, a seventh sub-extension part EX2_3 and an eighth sub-extension part EX2_4 that extend in the first diagonal direction DDR1, a third sub-conductive pattern SCP3 that extends in the first diagonal direction DDR1, and a fourth sub-conductive pattern SCP4 that extends in the second diagonal direction DDR2.

The second left sensing part SP2' has a structure symmetrical to that of the second right sensing part SP2'. The second extension part EX2 has a structure symmetrical to that of the first extension part EX1. Accordingly, hereinafter, descriptions of the fifth to eighth sub-extension parts EX2_1 to EX2_4 and third and fourth sub-conductive patterns SCP3 and SCP4 will be omitted to avoid redundancy.

Figure 11:
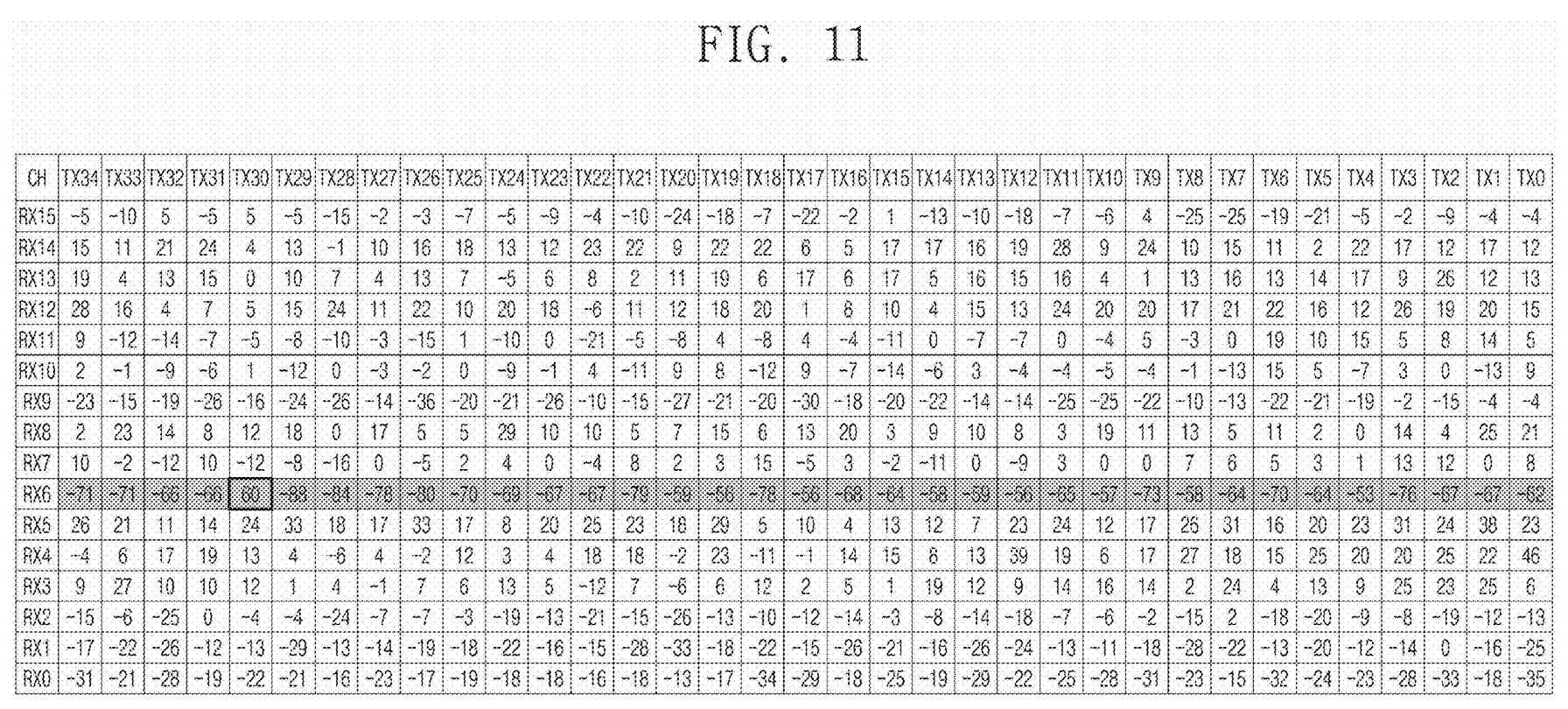

FIG. 11 is a table of sensor values of reception channels for transmission channels, according to an embodiment of the present disclosure.

Referring to the table of FIG. 11, the channel CH represents transmission channels TX0 to TX34 and reception channels RX0 to RX15. The transmission channels TX0 to TX34 correspond to the first sensing electrodes SE1. The second sensing electrodes SE2 correspond to the reception channels RX0 to RX15.

As illustrated in FIG. 6, the transmission channels TX0 to TX34 are defined by the first sensing electrodes SE1 connected to the first wires TXL1 to TXLk. As illustrated in FIG. 6, the reception channels RX0 to RX15 are defined by the second sensing electrodes SE2 connected to the second wires RXL1 to RXLh.

The transmission channels TX0 to TX34 include 0th to 34th transmission channels TX0 to TX34. The reception channels RX0 to RX15 include 0th to fifteenth reception channels RX0 to RX15. For example, 35 transmission channels TX0 to TX34 and 16 reception channels RX0 to RX15 are shown, but the number of transmission channels and the number of reception channels is not necessarily limited thereto.

Values written in the table correspond to sensor values output from the second sensing electrodes SE2 to the sensing controller T-IC. The values output from the second sensing electrodes SE2 to the sensing controller T-IC are converted to digital values in the sensing controller T-IC to define values of the reception channels RX0 to RX15.

The sensor values written in the table are the output values of the second sensing electrodes SE2 with respect to the first sensing electrodes SE1. For example, the values written in the table are values of intersection nodes of the first sensing electrodes SE1 and the second sensing electrodes SE2, which are output through the second sensing electrodes SE2. Accordingly, the values written in the table are values of the 0th to fifteenth reception channels RX0 to RX15 with respect to the 0th to 34th transmission channels TX0 to TX34.

A reference value is set in the sensing controller T-IC, and the reference value defines a baseline. The values written in the table are defined as positive and negative values based on the reference value. For example, assuming the reference value is 0, when the value is greater than the reference value, the value is expressed as a positive value. When the value is less than the reference value, the value is expressed as a negative value.

When no touch operation is performed, values of the 0th to fifteenth reception channels RX0 to RX15 are ideally the same as the reference value. However, the values of the 0th to fifteenth reception channels RX0 to RX15 may differ from the reference value depending on noise. The noise may be caused by signals from the display panel DP or signals from various surrounding electronic devices.

The values of the 0th to fifteenth reception channels RX0 to RX15 can deviate from the reference value due to noise. Noise may have various positive and negative values with respect to the reference value.

When a touch operation is performed, the value of a specific reception channel changes significantly compared to the reference value. When a value of the specific reception channel differs from the reference value by a predetermined value, a sensing controller recognizes a user's touch.

The values of the 0th to fifteenth reception channels RX0 to RX15 may be larger or smaller than the reference value due to noise. Minor noise does not affect a touch operation. However, great noise may be mistakenly recognized as a touch operation even though no touch operation was performed.

In an embodiment of the present disclosure, the input sensing part ISP performs a noise reduction operation. After the input sensing part ISP is manufactured, the noise reduction operation for the input sensing part ISP is tested. When the noise reduction operation performs normally, the input sensing part ISP may be identified as a good product. However, when the noise reduction operation does not perform properly, the input sensing part ISP may be identified as being defective.

Figure 12:
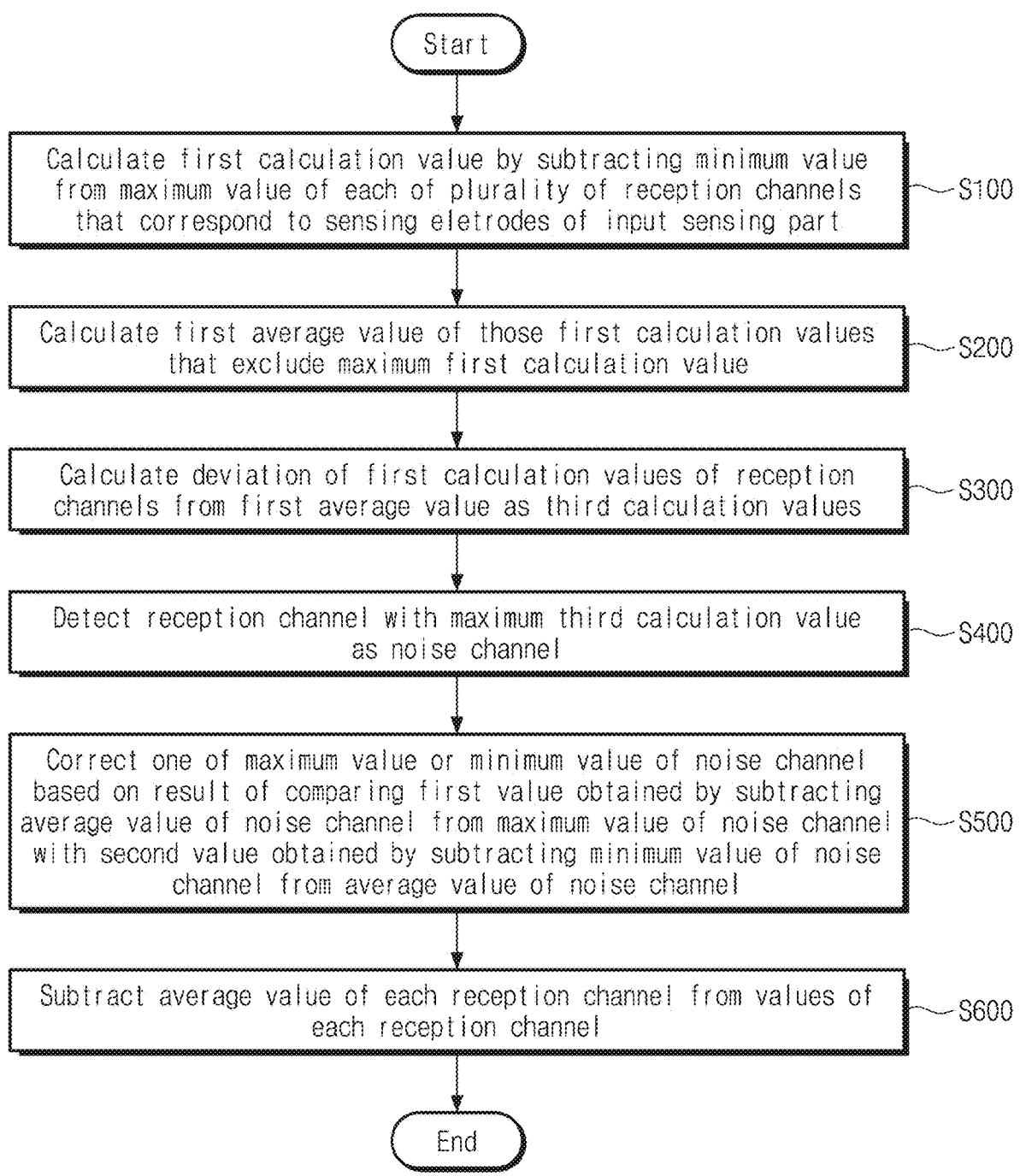
FIG. 12 is a flowchart of a noise reduction operation of an input sensing part, according to an embodiment of the present disclosure.

FIG. 12 is a flowchart of a noise reduction operation of an input sensing part, according to an embodiment of the present disclosure.

Referring to FIGS. 11 and 12, in an embodiment, values of the sixth reception channel RX6 are higher than those of other reception channels due to noise. For example, the values of the sixth reception channel RX6 deviate from a range between +50 and −50 with respect to a reference value. For example, due to noise in the sixth reception channel RX6, a touch malfunction recognized as a touch can occur even though a user's touch has not occurred.

Of the values of the sixth reception channel RX6, a value of the 30th transmission channel TX30 has a different sign from signs of values of other transmission channels TX0 to TX29 and TX31 to TX34. For example, of the values of the sixth reception channel RX6, the value of the 30th transmission channel TX30 has a positive sign. However, the values of other transmission channels TX0 to TX29 and TX31 to TX34 have negative signs. For example, the sign of one of the values of the sixth reception channel RX6 differs from the signs of other values.

A noise reduction operation of the input sensing part ISP includes operations S100 to S600. In operation S100, a first calculation value CAL1 is calculated by subtracting the minimum value MIN from the maximum value MAX of sensor values received from each of the 0th to fifteenth reception channels RX0 to RX15.

Table 1 below shows an average value AVG, the maximum value MAX, and the minimum value MIN of each of the 0th to fifteenth reception channels RX0 to RX15 shown in FIG. 11.

TABLE 1

| Channel | AVG | MAX | MIN |
|---|---|---|---|
| RX15 | −9 | 5 | −25 |
| RX14 | 15 | 28 | −1 |
| RX13 | 11 | 26 | −5 |
| RX11 | 15 | 28 | −6 |
| RX11 | −2 | 19 | −21 |
| RX10 | −2 | 15 | −14 |
| RX9 | −19 | −2 | −36 |
| RX8 | 11 | 29 | 0 |
| RX7 | 1 | 15 | −16 |
| RX6 | −64 | 60 | −88 |
| RX5 | 20 | 38 | 4 |
| RX4 | 13 | 46 | −11 |
| RX3 | 10 | 27 | −12 |
| RX2 | −12 | 2 | −26 |
| RX1 | −19 | 0 | −33 |
| RX0 | −23 | −13 | −35 |

Referring to Table 1, the average value AVG of the 0th to fifteenth reception channels RX0 to RX15 is obtained by adding values of the 0th to 34th transmission channels TX0 to TX34 for each of the 0th to fifteenth reception channels RX0 to RX15 and dividing the added result by the number of channels of the 0th to 34th transmission channels TX0 to TX34. The average value AVG is rounded to the first decimal place. The maximum value MAX and the minimum value MIN are a maximum value and a minimum value of the values of the 0th to fifteenth reception channels RX0 to RX15, respectively.

Table 2 below shows the first calculation value CAL1 calculated in operation S100. In Table 1, the first calculation values CAL1 for the 0th to fifteenth reception channels RX0 to RX15 in Table 2 below is calculated by subtracting the minimum value MIN from the maximum value MAX for each of the 0th to fifteenth reception channels RX0 to RX15.

TABLE 2

| Channel | CAL1(MAX-MIN) |
|---|---|
| RX15 | 30 |
| RX14 | 29 |
| RX13 | 31 |
| RX12 | 34 |
| RX11 | 40 |
| RX10 | 29 |
| RX9 | 34 |
| RX8 | 29 |
| RX7 | 31 |
| RX6 | 148 |
| RX5 | 34 |
| RX4 | 57 |
| RX3 | 39 |
| RX2 | 28 |
| RX1 | 33 |
| RX0 | 22 |

In operation S200, a first average value AVG1 of those first calculation values CAL1 that exclude the maximum first calculation value, is calculated. The first calculation values CAL1 that exclude the maximum first calculation value are defined as the second calculation values.

In Table 2, the maximum first calculation value of the first calculation values CAL1 of the 0th to fifteenth reception channels RX0 to RX15 is a value of the sixth reception channel RX6. The first calculation values CALL of the 0th to fifth reception channels RX0 to RX5 and the seventh to fifteenth reception channels RX7 to RX15, other than the sixth reception channel RX6, are defined as the second calculation values CAL2.

Table 3 below shows the second calculation values CAL2 of the 0th to fifth reception channels RX0 to RX5 and the seventh to fifteenth reception channels RX7 to RX15, and the first average value AVG1 of the second calculation values CAL2.

TABLE 3

| Channel | CAL2(MAX-MIN) |
|---|---|
| RX15 | 30 |
| RX14 | 29 |
| RX13 | 31 |
| RX12 | 34 |
| RX11 | 40 |
| RX10 | 29 |
| RX9 | 34 |
| RX8 | 29 |
| RX7 | 31 |
| RX5 | 34 |
| RX4 | 57 |
| RX3 | 39 |
| RX2 | 28 |
| RX1 | 33 |
| RX0 | 22 |
| AVG1 | 33 |

Referring to Table 3, the second calculation values CAL2 as shown in Table 3 are the first calculation values CALL of the 0th to fifth reception channels RX0 to RX5 and the seventh to fifteenth reception channels RX7 to RX15.

The number of digits (e.g., 3 digits) of the maximum first calculation value of the sixth reception channel RX6 is greater than the number of digits (e.g., 2 digits) of each of the second calculation values of the 0th to fifth reception channels RX0 to RX5 and the seventh to fifteenth reception channels RX7 to RX15.

Moreover, the maximum first calculation value is set depending on a predetermined reference value. For example, the first calculation value CALL of the sixth reception channel RX6, which is greater than or equal to the reference value, assuming that the reference value is set to 100, is set as the maximum first calculation value. Each of the second calculation values CAL2 of the 0th to fifth reception channels RX0 to RX5 and the seventh to fifteenth reception channels RX7 to RX15 is less than the reference value.

The sum of the second calculation values CAL2 is 500, and the number of channels of the 0th to fifth reception channels RX0 to RX5 and the seventh to fifteenth reception channels RX7 to RX15 is 15. Accordingly, the first average value AVG1 is calculated by dividing 500 by 15. The first average value AVG1 is calculated by rounding to the first decimal place. Accordingly, the first average value AVG1 is calculated as 33 as shown in Table 3.

In operation S300, a deviation of the first calculation values CALL of the 0th to fifteenth reception channels RX0 to RX15 from the first average value AVG1 is calculated as third calculation values CAL3.

Table 4 below shows the third calculation values CAL3 of the 0th to fifteenth reception channels RX0 to RX15.

TABLE 4

| Channel | CAL3 |
|---|---|
| RX15 | 10% |
| RX14 | 14% |
| RX13 | 6% |
| RX12 | 3% |
| RX11 | 21% |
| RX10 | 14% |
| RX9 | 3% |
| RX8 | 14% |
| RX7 | 6% |
| RX6 | 348% |
| RX5 | 3% |
| RX4 | 73% |
| RX3 | 18% |
| RX2 | 18% |
| RX1 | 0% |
| RX0 | 50% |

Figure 13:
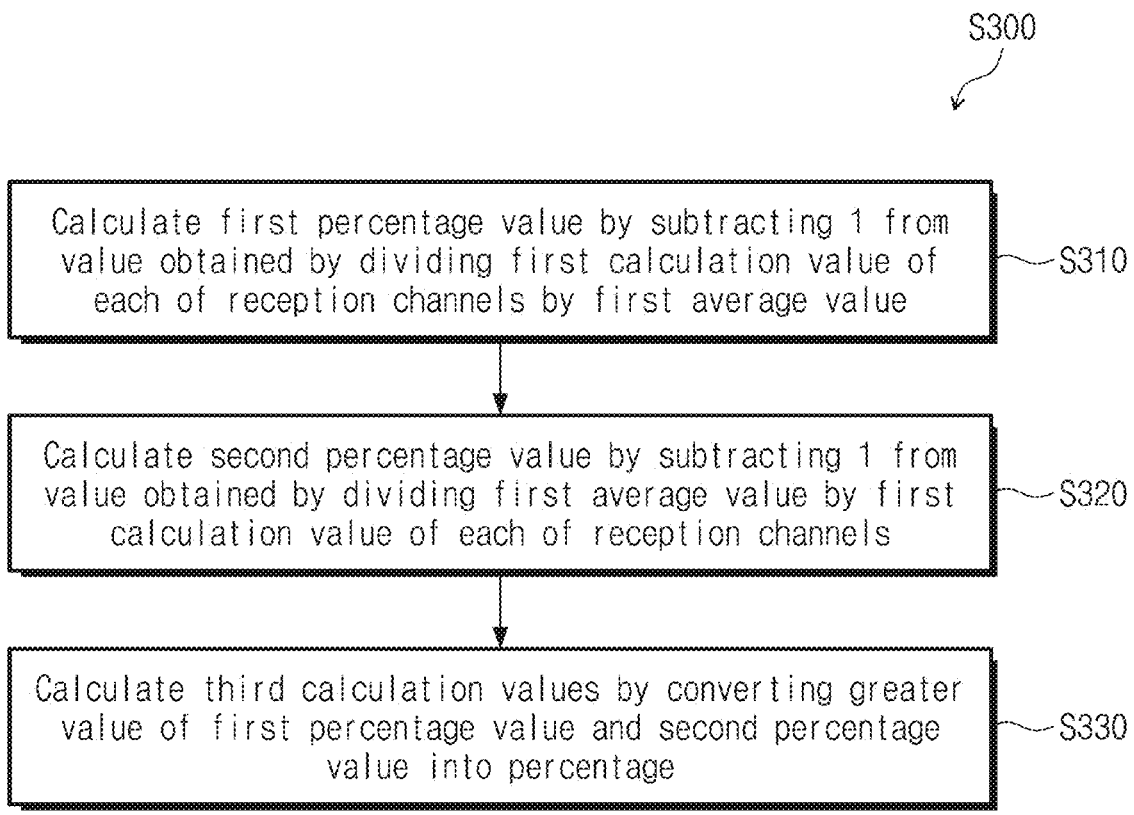
FIG. 13 is a flowchart of an operation of calculating third calculation values shown in FIG. 12.

FIG. 13 is a flowchart of an operation of calculating third calculation values shown in Table 4.

Referring to FIGS. 12 and 13, and Table 4, in an embodiment, the third calculation values CAL3 are calculated by converting a deviation of the first calculation values CAL1 from the first average value AVG1 into a percentage. For this operation, operation S300 of calculating the third calculation values CAL3 includes operations S310 to S330 shown in FIG. 13.

In operation S310, a first percentage value is calculated by subtracting 1 from a value obtained by dividing the first calculation value CALL of each of the 0th to fifteenth reception channels RX0 to RX15 by the first average value AVG1. In operation S320, a second percentage value is calculated by subtracting 1 from a value obtained by dividing the first average value AVG1 by the first calculation value CALL of each of the 0th to fifteenth reception channels RX0 to RX15.

In operation S330, the third calculation values CAL3 is calculated by converting the greater of the first percentage value and the second percentage value into a percentage. The third calculation value CAL3 is calculated by converting the value obtained by rounding to the third decimal place into a percentage.

For some reception channels, in operations S310 to 330, the third calculation values CAL3 is calculated as follows.

In the fifteenth reception channel RX15, the first calculation value CAL1 may be 30, and the first average value AVG1 may be 33. For example, the first percentage value is calculated as −0.09, and the second percentage value is calculated as 0.10. Because the second percentage value is greater than the first percentage value, the third calculation value CAL3 for the fifteenth reception channel RX15 is calculated as 10%. The first and second percentage values are obtained by rounding to the third decimal place. Accordingly, the third calculation value CAL3 for the fifteenth reception channel RX15 is calculated by rounding to the third decimal place.

In the eleventh reception channel RX11, the first calculation value CAL1 may be 40 and the first average value AVG1 may be 33. For example, the first percentage value is calculated as 0.21, and the second percentage value is calculated as −0.18. Because the first percentage value is greater than the second percentage value, the third calculation value CAL3 for the eleventh reception channel RX11 is calculated as 21%. Because the first and second percentage values are obtained by rounding to the third decimal place, the third calculation value CAL3 for the eleventh reception channel RX11 is calculated by rounding to the third decimal place.

In the sixth reception channel RX6, the first calculation value CAL1 may be 148, and the first average value AVG1 may be 33. For example, the first percentage value may be calculated as 3.48, and the second percentage value may be calculated as −0.78. Because the first percentage value is greater than the second percentage value, the third calculation value CAL3 for the sixth reception channel RX6 is calculated as 348%. Because the first and second percentage values are obtained by rounding to the third decimal place, the third calculation value CAL3 for the sixth reception channel RX6 is calculated by rounding to the third decimal place.

In operation S400, of the third calculation values CAL3 of the reception channels RX0 to RX15, the reception channel with the maximum third calculation value is detected as a noise channel. In an embodiment of the present disclosure, the noise channel is set as a reception channel that has the third calculation value CAL3 of 100% or more.

Referring to Table 4, the third calculation value CAL3 of the sixth reception channel RX6 is 348%, which is greater than or equal to 100%, and corresponds to the maximum third calculation value CAL3. Accordingly, the sixth reception channel RX6 is set as the noise channel. Hereinafter, the sixth reception channel RX6 is referred to as the "noise channel".

Values of the noise channel RX6 shown in FIG. 11 are values before correction. In FIG. 11, the value of the 30th transmission channel TX30 is 60, which is the maximum value. The maximum value of the noise channel RX6 has a different sign from the other values. For example, the value of the 30th transmission channel TX30 for the noise channel RX6 has a positive value, and values of other transmission channels TX0 to TX29 and TX31 to TX34 for the noise channel RX6 have negative values.

In operation S500, on the basis of the result of comparing a first value VAL1 obtained by subtracting the average value AVG of the noise channel RX6 from the maximum value of the noise channel RX6 with a second value VAL2 obtained by subtracting the minimum value of the noise channel RX6 from the average value AVG of the noise channel RX6, one of the maximum value or minimum value of the noise channel RX6 is corrected.

Table 5 below shows the first values VAL1 and the second values VAL2 of the 0th to fifteenth reception channels RX0 to RX15, and the comparison of the first values VAL1 and the second values VAL2. The greater of the first values and second values is written in a comparison item of Table 5.

TABLE 5

| Channel | VAL1(MAX-AVG) | VAL2(AVG-MIN) | Comparison |
| --- | --- | --- | --- |
| RX15 | 14 | 16 | 16 |
| RX14 | 13 | 16 | 16 |
| RX13 | 15 | 16 | 16 |
| RX12 | 13 | 21 | 21 |
| RX11 | 21 | 19 | 21 |
| RX10 | 17 | 12 | 17 |
| RX9 | 17 | 17 | 17 |
| RX8 | 18 | 11 | 18 |
| RX7 | 14 | 17 | 17 |
| RX6 | 124 | 24 | 124 |
| RX5 | 18 | 16 | 18 |
| RX4 | 33 | 24 | 33 |
| RX3 | 17 | 22 | 22 |
| RX2 | 14 | 14 | 14 |
| RX1 | 19 | 14 | 19 |
| RX0 | 10 | 12 | 12 |

The first values VAL1 are calculated by subtracting the average value AVG of each of the 0th to fifteenth reception channels RX0 to RX15 from the maximum value of each of the 0th to fifteenth reception channels RX0 to RX15. The second values VAL2 are calculated by subtracting the minimum value of each of the 0th to fifteenth reception channels RX0 to RX15 from the average value AVG of each of the 0th to fifteenth of the reception channels RX0 to RX15.

As illustrated in Table 1 and Table 3 above, the maximum value of the noise channel RX6 is 60, and the average value AVG of the noise channel RX6 is −64. Accordingly, the first value VAL1 of the noise channel RX6, which is obtained by subtracting the average value AVG of the noise channel RX6 from the maximum value of the noise channel RX6, is 124 by calculating "60−(−64)".

The minimum value of the noise channel RX6 is −88, and the average value AVG of the noise channel RX6 is −64. Accordingly, the second value VAL2 of the noise channel RX6, which is obtained by subtracting the minimum value of the noise channel RX6 from the average value AVG of the noise channel RX6, is 24 by calculating "−64−(−88)". Because the first value VAL1 is greater than the second value VAL2, 124 is written in the comparison item for the noise channel RX6 in Table 5.

Figure 14:
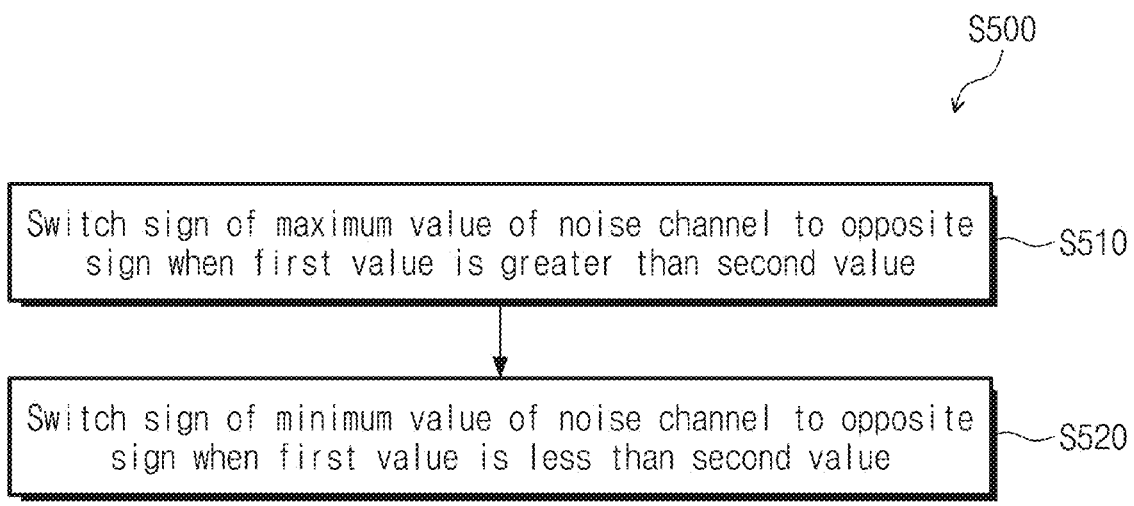
FIG. 14 is a flowchart of a compensation operation for a maximum value and a minimum value of a noise channel according to the comparison result of the first value and the second value shown in FIG. 12.
Figure 15:
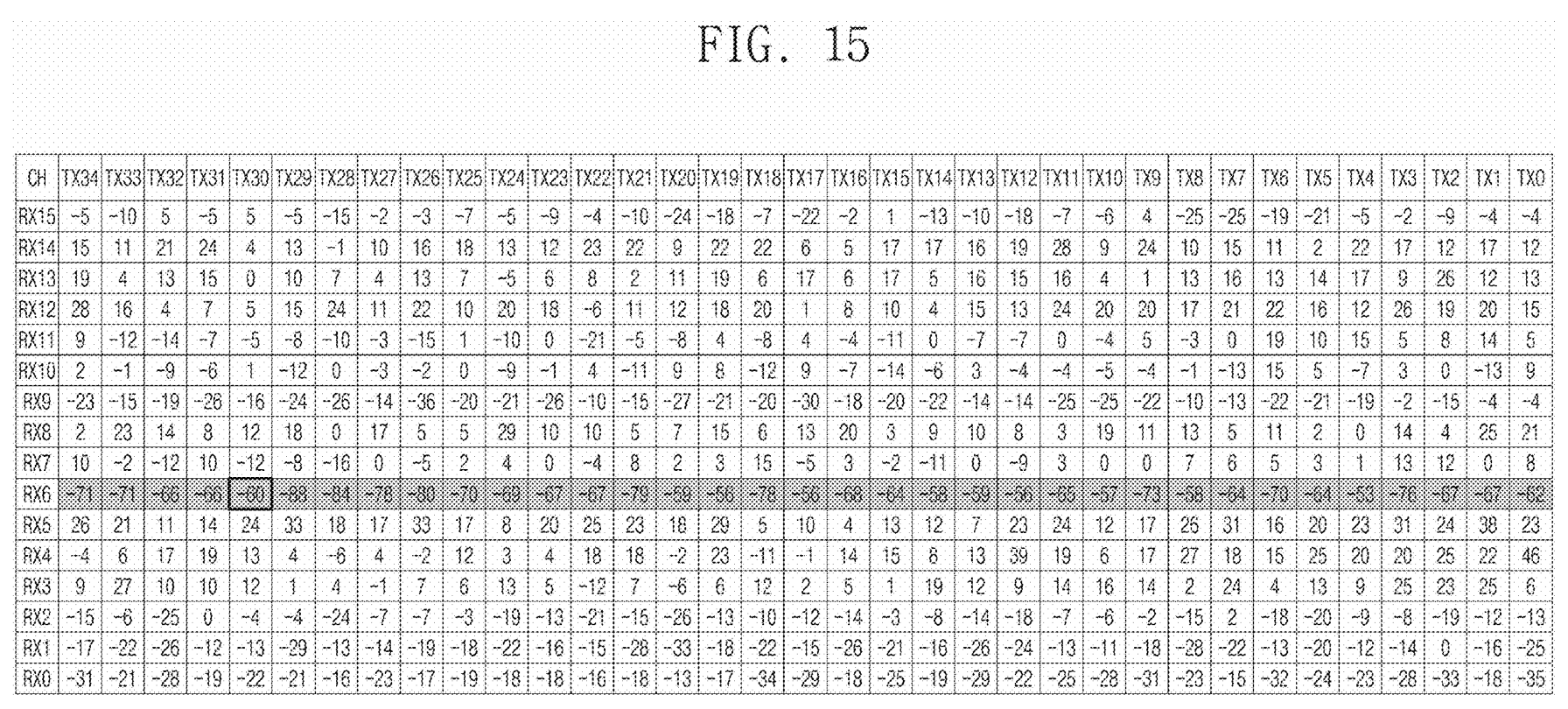

FIG. 14 is a flowchart of a compensation operation for a maximum value and a minimum value of a noise channel according to the comparison result of the first value and the second value shown in FIG. 12. FIG. 15 is a table of values in a state in which a sign of a maximum value of the noise channel in FIG. 11 is switched.

Referring to FIG. 12, Table 5, and FIGS. 14 and 15, in an embodiment, in operation S500, one of the maximum value or minimum value of the noise channel RX6 is corrected such that a sign is switched. For example, the correction stage of operation S500 includes operation S510 and S520 shown in FIG. 14.

In operation S510, when the first value VAL1 is greater than the second value VAL2, a sign of the maximum value MAX of the noise channel RX6 is switched to the opposite sign. In operation S520, when the first value VAL1 is less than the second value VAL2, a sign of the minimum value MIN of the noise channel RX6 is switched to the opposite sign.

As shown in Table 5, in the noise channel RX6, the first value VAL1 is greater than the second value VAL2. Accordingly, as shown in FIG. 15, the sign of the maximum value MAX of the noise channel RX6 for the 30th transmission channel TX30 is switched such that the maximum value MAX is switched from 60 to −60.

Figure 16:
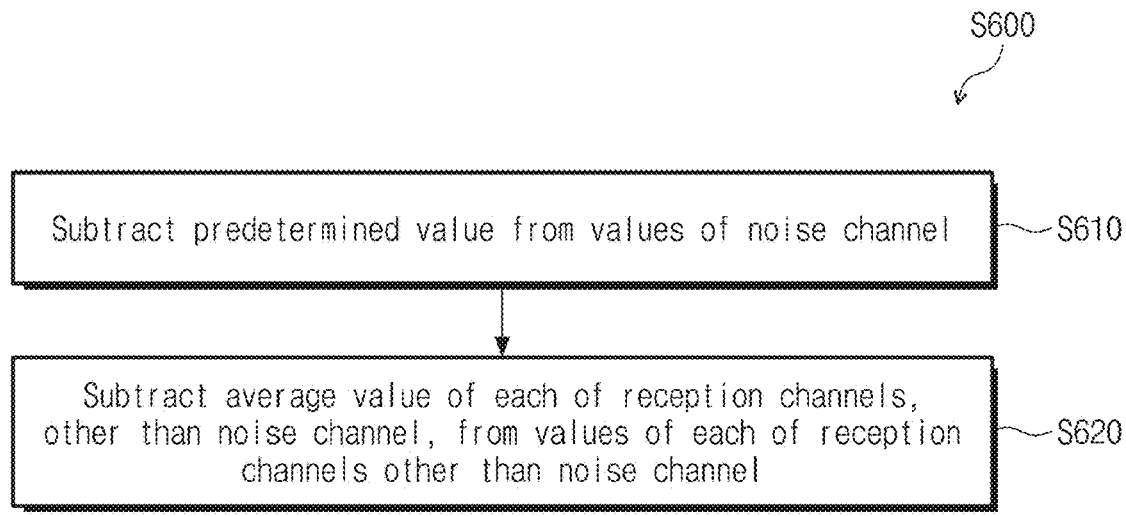
FIG. 16 is a flowchart of a noise reduction operation in operation S600 of FIG. 12.
Figure 17:
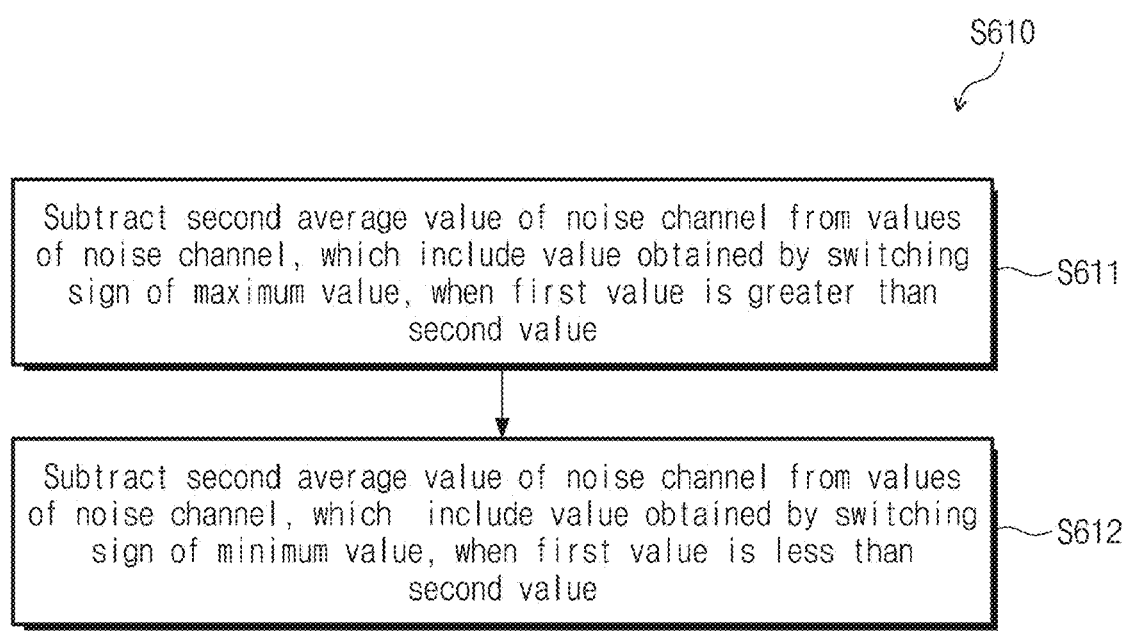
FIG. 17 is a flowchart of an operation of subtracting a predetermined calculation value from values of the noise channel of FIG. 16.

FIG. 16 is a flowchart of a noise reduction operation in operation S600 shown in FIG. 12. FIG. 17 is a flowchart of an operation of subtracting a predetermined value from values of the noise channel shown in FIG. 16. FIG. 18 is a table of values of reception channels converted depending on a noise reduction operation.

Referring to FIGS. 12, 15, 16, and 17, in an embodiment, in operation S600, noise is removed from the 0th to fifteenth reception channels RX0 to RX15 by subtracting the average value AVG of each of the 0th to fifteenth reception channels RX0 to RX15 from values of each of the 0th to fifteenth reception channels RX0 to RX15. Operation S600 is a noise reduction operation.

Operation S600 of performing a noise reduction operation includes operations S610 and S620 shown in FIG. 16. In operation S610, a predetermined value is subtracted from values of the noise channel RX6.

The values of the noise channel RX6 include a correction value. The correction value is obtained by switching the sign of the maximum value MAX of the noise channel RX6 or by switching the sign of the minimum value MIN of the noise channel RX6. The predetermined value is the average of values of the noise channel RX6. The average of the values of the noise channel RX6 may be defined as a second average value AVG2. The second average value AVG2 of the noise channel RX6 will be shown in Table 6 below.

In operation S620, the average value AVG of the reception channels RX0 to RX5 and RX7 to RX15, other than the noise channel RX6, is subtracted from values of the reception channels RX0 to RX5 and RX7 to RX15, other than the noise channel RX6.

Operation S610 of subtracting the predetermined value from values of the noise channel RX6 includes operations S611 and S612 shown in FIG. 17. In operation S611, when the first value VAL1 is greater than the second value VAL2, the second average value AVG2 of the noise channel RX6 is subtracted from the values of the noise channel RX6, which include a value obtained by switching the sign of the maximum value MAX.

In operation S612, when the first value VAL1 is less than the second value VAL2, the second average value AVG2 of the noise channel RX6 is subtracted from the values of the noise channel RX6, which include a value obtained by switching the sign of the minimum value MIN.

As described above, because the sign of the maximum value MAX of the noise channel RX6 has been switched, operation S611 is performed. The values of the noise channel RX6 include a value obtained by switching the sign of the maximum value MAX described above. For example, the values of the noise channel RX6 include a value of −60, which is obtained by converting 60, the value of the 30th transmission channel TX30.

Table 6 below shows average values AVG of the 0th to fifteenth reception channels RX0 to RX15 calculated according to operation S600. Of the average values AVG, the average value of the noise channel RX6 is defined as the second average value AVG2. The second average value AVG2 is calculated by rounding to the first decimal place.

TABLE 6

| Channel | AVG |
| --- | --- |
| RX15 | −9 |
| RX14 | 15 |
| RX13 | 11 |
| RX11 | 15 |
| RX11 | −2 |
| RX10 | −2 |
| RX9 | −19 |
| RX8 | 11 |
| RX7 | 1 |
| RX6 | −67(AVG2) |
| RX5 | 20 |
| RX4 | 13 |
| RX3 | 10 |
| RX2 | −12 |
| RX1 | −19 |
| RX0 | −23 |

Referring to FIGS. 16, 17, and 18, and Table 6, in an embodiment, compared to FIG. 12, values of the 0th to fifth reception channels RX0 to RX5 and the seventh to fifteenth reception channels RX7 to RX15 are not converted. However, according to the above-described operation, the sign of 60, which is the maximum value of the noise channel RX6 for the 30th transmission channel TX30, is switched, and the maximum value of the noise channel RX6 is −60.

Accordingly, the average values AVG of the 0th to fifth reception channels RX0 to RX5 and the seventh to fifteenth reception channels RX7 to RX15 is the same as those in Table 1. However, because the sign of 60, which is the maximum value MAX of the noise channel RX6 for the 30th transmission channel TX30, is switched and the maximum value MAX of the noise channel RX6 is −60, the second average value AVG2 of the values of the noise channel RX6 is −67.

According to the noise reduction operation S600, noise is removed from each of the 0th to fifteenth reception channels RX0 to RX15 by subtracting the average value AVG of each of the 0th to fifteenth reception channels RX0 to RX15 shown in Table 6 is subtracted from values of each of the 0th to fifteenth reception channels RX0 to RX15.

According to the noise reduction operation of the noise channel RX6 in operation S610, −67, which is the average value of the noise channel RX6, is subtracted from the values of the noise channel RX6. For example, a value of the 34th transmission channel TX34 of the noise channel RX6 is calculated as "−71−(−67)" and equals −4. A value of the 32nd transmission channel TX32 of the noise channel RX6 is calculated as "−66−(−67)" and equals 1. A value of the 30th transmission channel TX30 of the noise channel RX6 is calculated as "−60−(−67)" and equals 7.

According to a noise reduction operation of the reception channels RX0 to RX5 and RX7 to RX15 excluding the noise channel RX6 in operation S620, the average value AVG of each of the reception channels RX0 to RX5 and RX7 to RX15 is subtracted from the values of each of the reception channels RX0 to RX5 and RX7 to RX15.

For example, to explain the noise reduction operation for the fifteenth reception channel RX15, −9, which is the average of the fifteenth reception channel RX15, is subtracted from the values of the fifteenth reception channel RX15. For example, a value of the 34th transmission channel TX34 of the fifteenth reception channel RX15 is calculated as "−5−(−9)" and equals 4. A value of the 33rd transmission channel TX33 of the fifteenth reception channel RX15 is calculated as "−10−(−9)" and equals −1. A value of the 27th transmission channel TX27 of the fifteenth reception channel RX15 is calculated as "−2−(−9)" and equals 7.

According to an above-described calculation method according to an embodiment of the present disclosure, the values of the 0th to fifteenth reception channels RX0 to RX15, which include the noise channel RX6, are converted.

According to a noise reduction operation, the values shown in FIG. 11 are converted to the values shown in FIG. 18. The values shown in FIG. 18 are closer to 0, which is the above-described reference (baseline) value, than the values shown in FIG. 11. Accordingly, noise for the 0th to fifteenth reception channels RX0 to RX15 is reduced.

Figure 19:
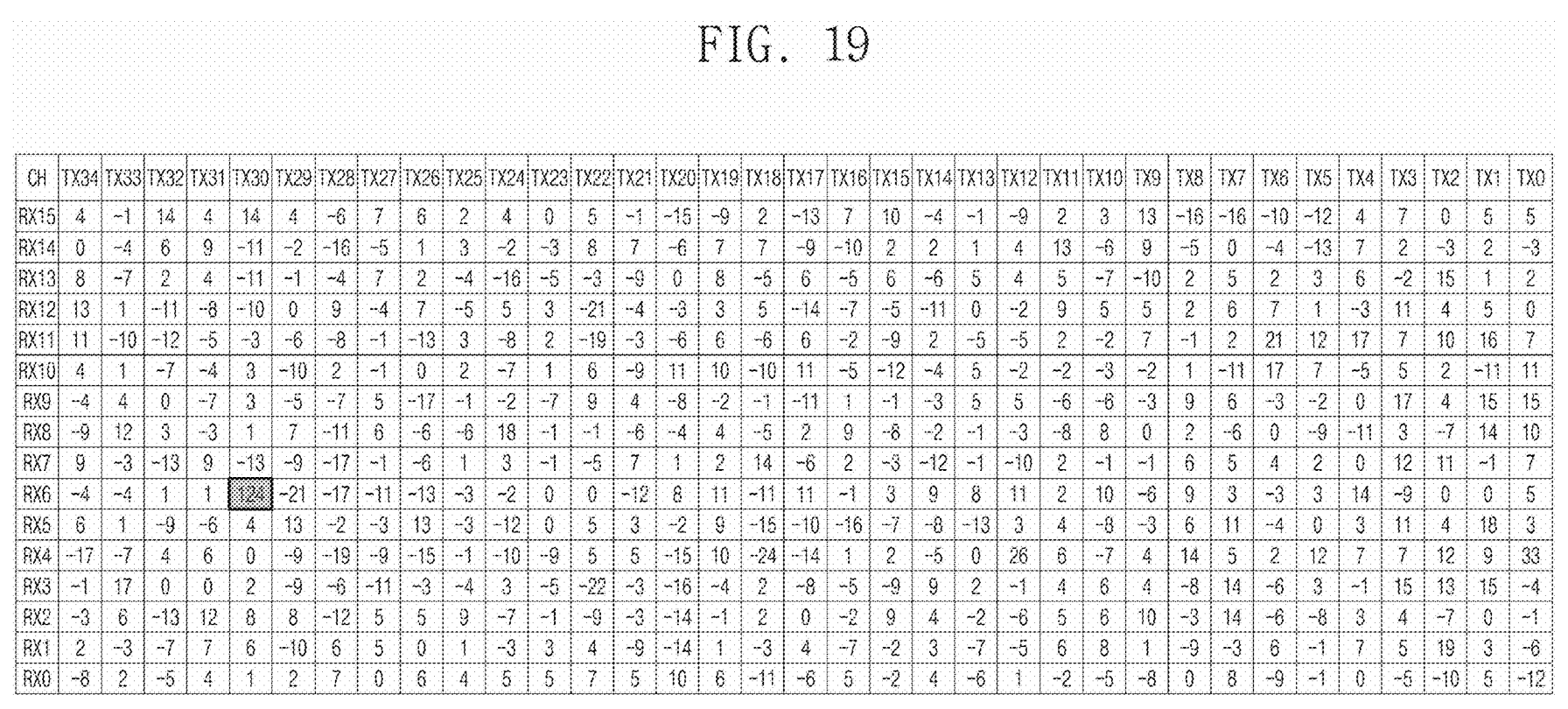

FIG. 19 is a table of values of reception channels when operation S600 is performed without the above-described operations S100 to S500.

Referring to FIG. 11, Table 1, and FIG. 19, when the above-described operations S100 to S500 are not performed, the maximum value MAX of the noise channel RX6 is maintained as 60 without the sign being switched. As shown in Table 1, the average value AVG of the noise channel RX6 is −64. According to a noise reduction operation, the average value of the noise channel RX6 is subtracted from the values of the noise channel RX6.

For example, the value of the noise channel RX6 for the 30th transmission channel TX30 is calculated as "60−(−64)" and is converted to 124. Accordingly, noise is greater than before a noise reduction operation.

However, in an embodiment of the present disclosure, as the above-described operations S100 to S500 are performed, a value of the noise channel RX6 for the 30th transmission channel TX30 is calculated as "−60−(−67)" and is converted to 7. Accordingly, the noise for the noise channel RX6 is easily reduced.

Figure 20:
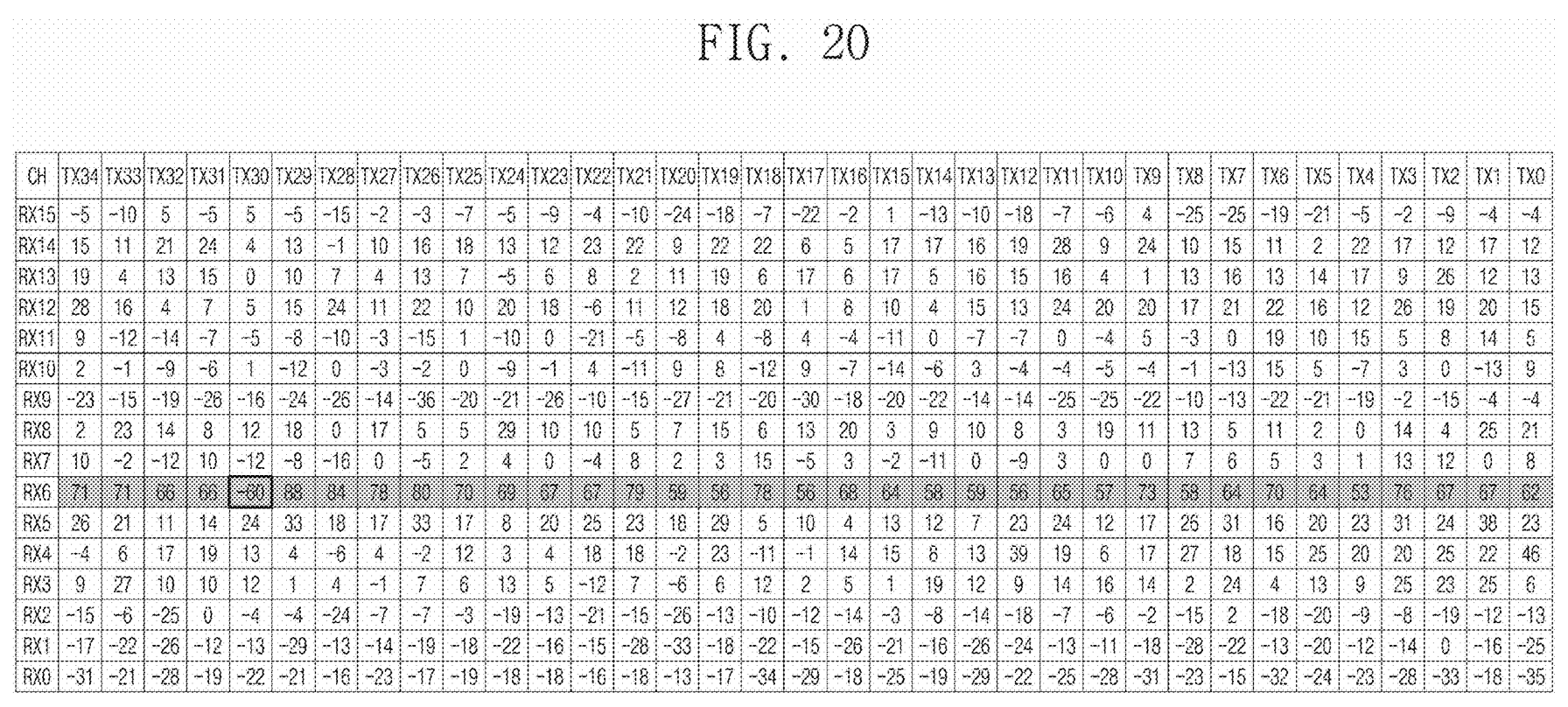
Figure 21:
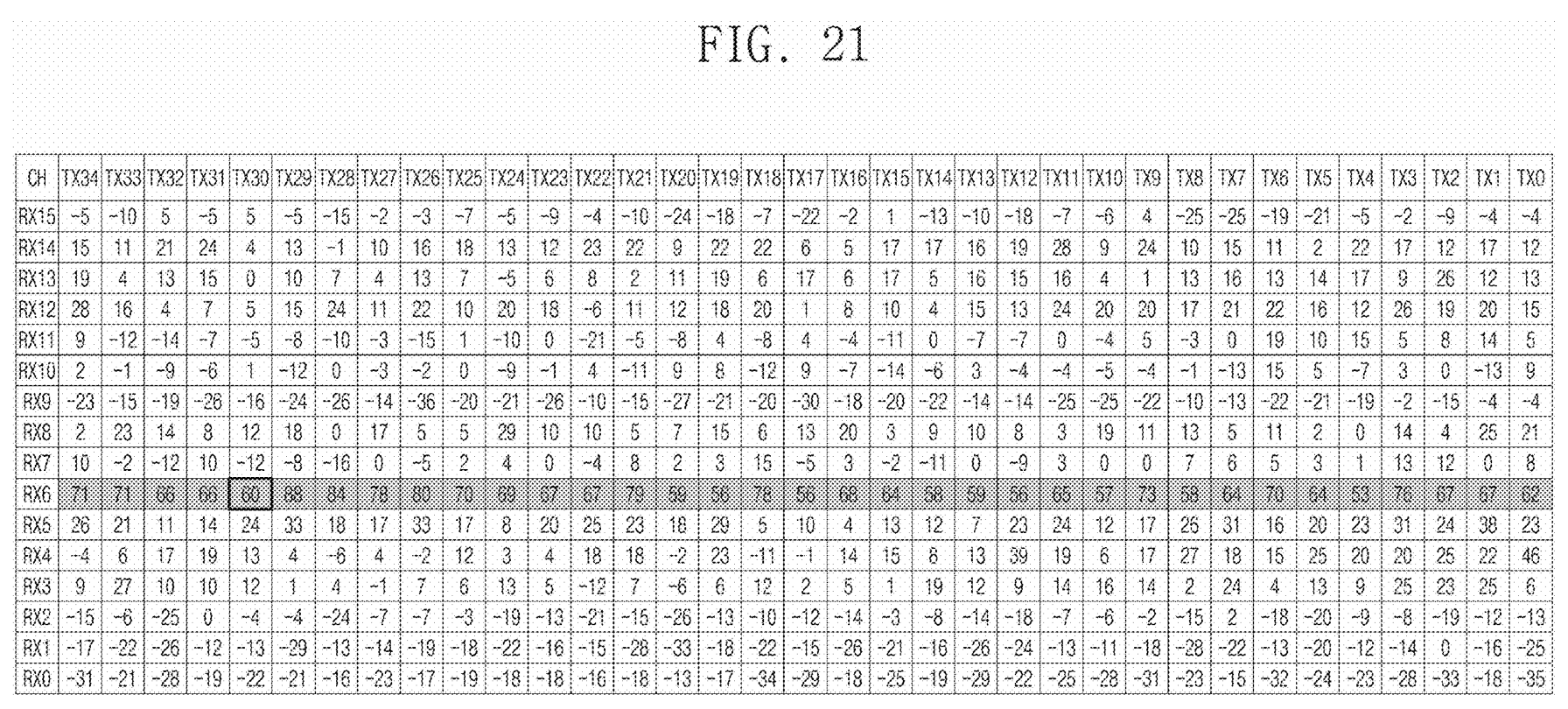
Figure 22:
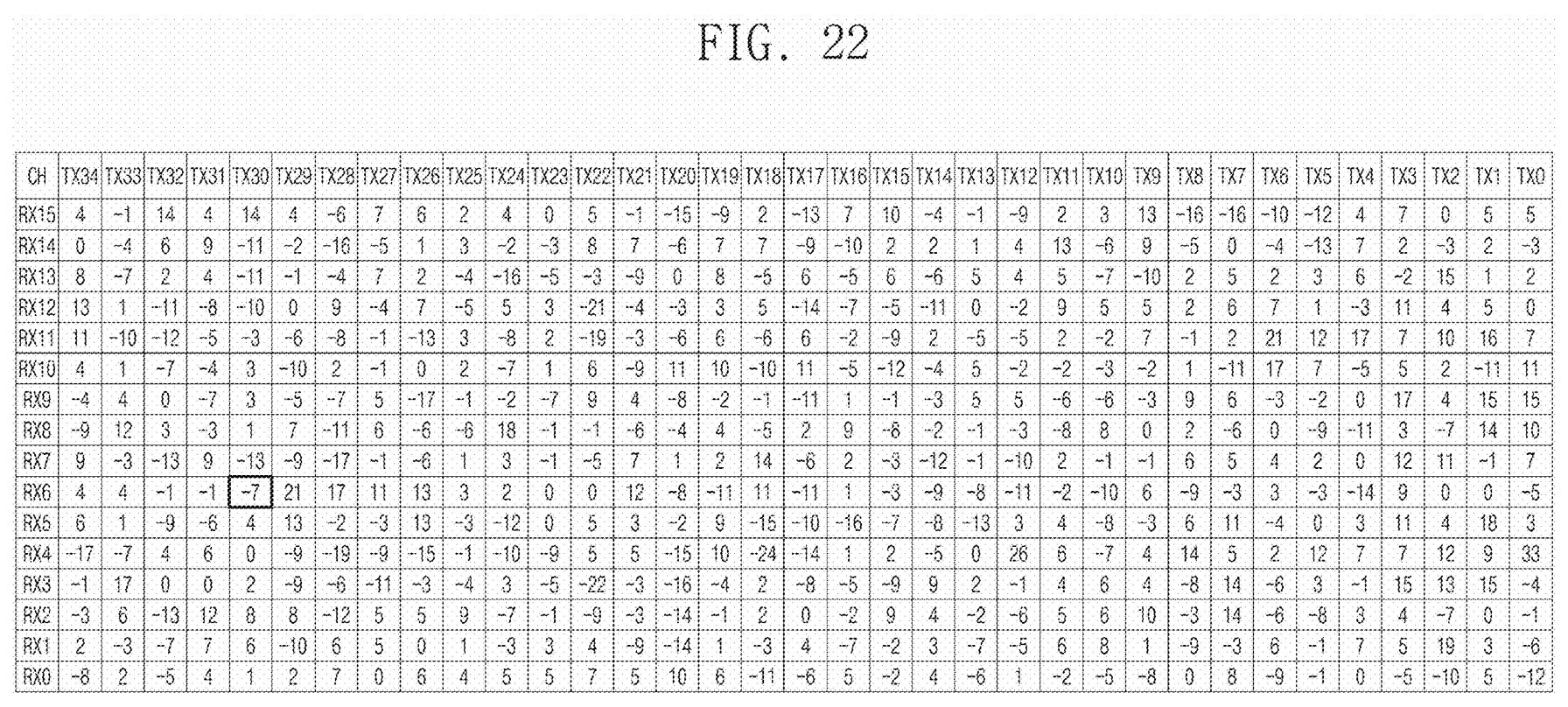

FIG. 20 is a table of values of reception channels for transmission channels. FIG. 21 is a table of values in a state where a sign of a minimum value of the noise channel in FIG. 20 is converted. FIG. 22 is a table of values of reception channels converted depending on the noise reduction operation in FIG. 20.

Referring to FIGS. 12, 13, and 20, in an embodiment, signs of values of the sixth reception channel RX6 are opposite to those of values of the sixth reception channel RX6 shown in FIG. 11. Accordingly, a value of the sixth reception channel RX6 for the 30th transmission channel TX30 is 60.

Of the values of the sixth reception channel RX6, the sign of the value of the sixth reception channel RX6 for the 30th transmission channel TX30 differs from a sign of values of the other transmission channels TX0 to TX29 and TX31 to TX34. For example, of the values of the sixth reception channel RX6, the value of the 30th transmission channel TX30 has a negative sign, and the values of other transmission channels TX0 to TX29 and TX31 to TX34 have positive signs. The values of the other reception channels RX0 to RX5 and RX7 to RX15 are the same as the values of the reception channels RX0 to RX5 and RX7 to RX15 shown in FIG. 11.

Before correcting according to Table 1, an average value of the sixth reception channel RX6 is 64. Of the values of the sixth reception channel RX6, the maximum value MAX is 88, and the minimum value MIN is −60. In FIG. 20, the average value AVG, the maximum value MAX, and the minimum value MIN of other reception channels RX0 to RX5 and RX7 to RX15 are the same as those in Table 1.

In operation S100 described above, with regard to values in FIG. 20, a first calculation value CAL1 is calculated by subtracting the minimum value MIN from the maximum value MAX of each of the 0th to fifteenth reception channels RX0 to RX15. The first calculation value CAL1 for FIG. 20 is the same as that in Table 2. For example, a value obtained by subtracting the maximum value MAX and the minimum value MIN from the value of the sixth reception channel RX6 is 148 by calculating "88−(−60)".

In operation S200, with regard to values in FIG. 20, a first average value AVG1 of the second calculation values CAL2, which is defined as those values that exclude the maximum first calculation value from the first calculation values CAL1 of the 0th to fifteenth reception channels RX0 to RX15, is calculated.

The first calculation value CAL1 of the sixth reception channel RX6 is the maximum value, and thus the second calculation values CAL2 is defined as the first calculation values CAL1 of the 0th to fifth reception channels RX0 to RX5 and the seventh to fifteenth reception channels RX7 to RX15. Accordingly, the second calculation values CAL2 of FIG. 20 may be the same as those in Table 3. Because the second calculation values CAL2 of FIG. 20 are the same as those in Table 3, the first average value AVG1 is also 33, as in Table 3.

In operation S300, with regard to values in FIG. 20, a deviation of the first calculation values CAL1 of the 0th to fifteenth reception channels RX0 to RX15 from the first average value AVG1 is calculated as third calculation values CAL3.

Because the first calculation value CAL1, the second calculation value CAL2, and the first average value AVG1 in FIG. 20 are the same as those in Table 2 and Table 3 described above, the third calculation value CAL3 in FIG. 20 is the same as that in Table 4 described above. For example, in the sixth reception channel RX6, the first calculation value CAL1 is 148, and the first average value AVG1 is 33. Accordingly, the third calculation value CAL3 is calculated as 348%.

In operation S400, with regard to values in FIG. 20, a reception channel that corresponds to the maximum third calculation value CAL3 is set as a noise channel. Because the third calculation value CAL3 for the sixth reception channel RX6 is 348%, the noise channel is set to the sixth reception channel RX6.

The values of the noise channel RX6 shown in FIG. 20 are the values before correction. Of the values of the noise channel RX6, the value of the 30th transmission channel TX30, which is −60, is the minimum value. The minimum value of the noise channel RX6 has a different sign from the signs of other values. For example, the value of the 30th transmission channel TX30 for the noise channel RX6 has a negative value, and values of other transmission channels TX0 to TX29 and TX31 to TX34 for the noise channel RX6 have positive values.

In operation S500, with regard to values in FIG. 20, on the basis of a result of comparing a first value VAL1 obtained by subtracting the average value AVG of the noise channel RX6 from the maximum value MAX of the noise channel RX6, with a second value VAL2 obtained by subtracting the minimum value MIN of the noise channel RX6 from the average value AVG of the noise channel RX6, one of the maximum value MAX or minimum value MIN of the noise channel RX6 is corrected.

With regard to values in FIG. 20, the maximum value of the noise channel RX6 is 88, and the average value AVG of the noise channel RX6 is 64. Accordingly, the first value VAL1 of the noise channel RX6, which is obtained by subtracting the average value AVG of the noise channel RX6 from the maximum value MAX of the noise channel RX6, is 24 by calculating "88−64".

The minimum value MIN of the noise channel RX6 is −60, and the average value AVG of the noise channel RX6 is 64. Accordingly, the second value VAL2 of the noise channel RX6, which is obtained by subtracting the minimum value MIN of the noise channel RX6 from the average value AVG of the noise channel RX6, is 124 by calculating "64−(−60)". Accordingly, the first value VAL1 is less than the second value VAL2.

Referring to FIGS. 12, 14, and 21, in an embodiment, in operation S520 described above, when the first value VAL1 is less than the second value VAL2, a sign of the minimum value MIN of the noise channel RX6 is switched to the opposite sign. Accordingly, as shown in FIG. 21, the sign of the minimum value MIN of the noise channel RX6 for the 30th transmission channel TX30 is switched such that the minimum value MIN is switched from −60 to 60.

The values of the noise channel RX6 include a value obtained by switching the sign of the minimum value MIN. The values of the noise channel RX6 include the value of 60, which is obtained by converting −60, which is the value of the 30th transmission channel TX30.

Referring to FIGS. 12, 16, 17, and 22, in an embodiment, in operation S600 described above, noise is removed from each of the 0th to fifteenth reception channels RX0 to RX15 by subtracting the average value of each of the 0th to fifteenth reception channels RX0 to RX15 from values of each of the 0th to fifteenth reception channels RX0 to RX15.

The values of the 0th to fifth reception channels RX0 to RX5 and the seventh to fifteenth reception channels RX7 to RX15 are the same as those in FIGS. 11 and 22. Accordingly, the values of the 0th to fifth reception channels RX0 to RX5 and the seventh to fifteenth reception channels RX7 to RX15 according to a noise reduction operation are the same as those in FIGS. 11 and 22.

Because the first value VAL1 is less than the second value VAL2, in operation S612, the second average value AVG2 of the noise channel RX6 are subtracted from the values of the noise channel RX6, which includes the value obtained by switching the sign of the minimum value MIN.

Because the sign of −60, which is the minimum value MIN of the noise channel RX6 for the 30th transmission channel TX30, is switched and the minimum value MIN of the noise channel RX6 is 60, the second average value AVG2 of the noise channel RX6 is 67. The noise reduction operation for the noise channel RX6 is performed by subtracting 67, which is the second average value AVG2 of the noise channel RX6, from the values of the noise channel RX6. For example, the value of the noise channel RX6 for the 30th transmission channel TX30 is calculated as "60−(67)" and is converted to −7.

According to this operation, the values shown in FIG. 20 are converted to the values shown in FIG. 22, and thus noise for the 0th to fifteenth reception channels RX0 to RX15 is reduced.

Figure 23:
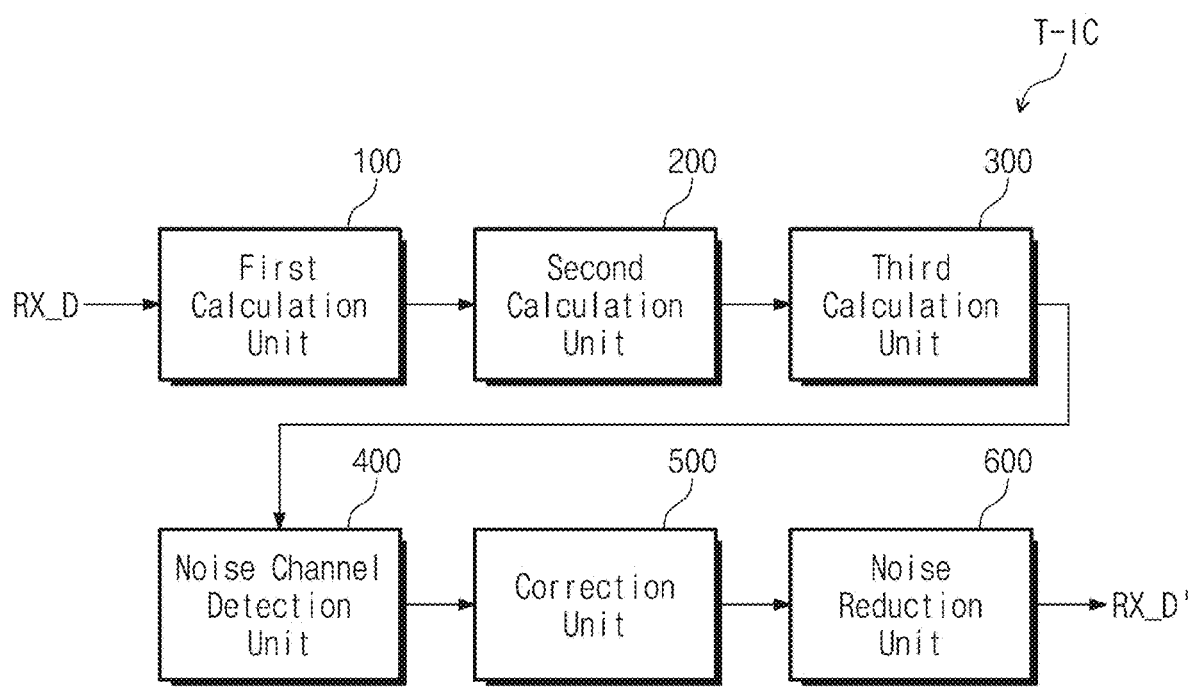
FIG. 23 is a block diagram of a sensing controller that performs a noise reduction method of FIG. 12, according to an embodiment of the present disclosure.

FIG. 23 is a block diagram of a sensing controller that performs a noise reduction method shown in FIG. 12.

Referring to FIG. 23, in an embodiment, the sensing controller T-IC of the input sensing part ISP includes a first calculation part 100, a second calculation part 200, a third calculation part 300, a noise channel detection part 400, a correction part 500, and a noise reduction part 600.

The first calculation part 100 calculates the first calculation value CAL1 by subtracting the minimum value MIN from the maximum value MAX of values RX_D of each of the 0th to fifteenth reception channels RX0 to RX15. The first calculation values CAL1 of the reception channels RX0 to RX15 are provided to the second calculation part 200. The values RX_D of each of the reception channels RX0 to RX15 are continuously provided to the second calculation part 200, the third calculation part 300, the noise channel detection part 400, the correction part 500, and the noise reduction part 600.

The second calculation part 200 calculates a first average value AVG1 of those first calculation values CAL1 that exclude the maximum first calculation value of the 0th to fifteenth reception channels RX0 to RX15. The first calculation values CAL1 and the first average value AVG1 are provided to the third calculation part 300.

The third calculation part 300 calculates a deviation of the first calculation values CAL1 of the 0th to fifteenth reception channels RX0 to RX15 from the first average value AVG1, as the third calculation values CAL3. The third calculation values CAL3 of the reception channels RX0 to RX15 is provided to the noise channel detection part 400.

The noise channel detection part 400 detects a reception channel with the maximum third calculation value CAL3 of the reception channels RX0 to RX15 as a noise channel. On the basis of the values shown in FIG. 11 described above, the sixth reception channel RX6 is detected as the noise channel. Information about the noise channel is provided to the correction part 500.

The correction part 500 corrects the first value VAL1 obtained by subtracting the average value AVG of the noise channel RX6 from the maximum value MAX of the noise channel RX6, and the second value VAL2 obtained by subtracting the minimum value MIN of the noise channel RX6 from the average value AVG of the noise channel RX6.

The correction part 500 corrects one of the maximum value MAX or the minimum value MIN of the noise channel RX6 based on the comparison result. When the first value VAL1 is greater than the second value VAL2, operation S510 described above is performed. When the first value VAL1 is less than the second value VAL2, operation S520 described above is performed. The correction value is provided to the noise reduction part 600.

The noise reduction part 600 performs the noise reduction operation in operation S600 described above. The noise reduction part 600 subtracts the average value of each of the reception channels RX0 to RX15 from the values of each of the reception channels RX0 to RX15. The noise reduction part 600 subtracts the second average value AVG2 of the noise channel RX6 from the values of the noise channel RX6 that include the correction value. Accordingly, noise for the values of the reception channels RX0 to RX15 is reduced. The noise reduction part 600 outputs noise-reduced values RX_D'.

Although described above with reference to an embodiment, it will be understood by those skilled in the art that various modifications and changes may be made to embodiments of the present disclosure without departing from the spirit and scope of embodiments of the present disclosure as set forth in the claims below. Furthermore, embodiments of the present disclosure are not intended to limit the technical spirit of the present disclosure. All technical spirits within the scope of the following claims and all equivalents thereof should be construed as being included within the scope of the present disclosure.

According to an embodiment of the present disclosure, a noise reduction operation can be performed on values of a noise channel by converting the sign of a maximum value or a minimum value of a noise channel, which has a sign different from other values, according to a predetermined standard. As a result, noise in the noise channel can be reduced.

While embodiments of the present disclosure have been described with reference to drawings thereof, it will be apparent to those of ordinary skill in the art that various changes and modifications may be made thereto without departing from the spirit and scope of embodiments of the present disclosure as set forth in the following claims.

What is claimed is:

1. A noise reduction method of an input sensing part, the method comprising:

calculating a first calculation value by subtracting a minimum value from a maximum value of sensor values received from a plurality of reception channels that correspond to sensing electrodes of the input sensing part;

calculating a first average value of second calculation values defined as those first calculation values of the reception channels that exclude a maximum first calculation value;

calculating a deviation of the first calculation values from the first average value as third calculation values;

detecting a reception channel with a maximum third calculation value as a noise channel;

correcting one of a maximum value or a minimum value of the noise channel based on a result of comparing a first value obtained by subtracting an average value of the noise channel from the maximum value of the noise channel with a second value obtained by subtracting the minimum value of the noise channel from the average value of the noise channel; and removing noise from the noise channel by subtracting a predetermined value from values of the noise channel.

2. The method of claim 1, wherein a number of digits of the maximum first calculation value is greater than a number of digits of each of the second calculation values.

3. The method of claim 1, wherein the maximum first calculation value is greater than or equal to a reference value, and each of the second calculation values is less than the reference value.

4. The method of claim 1, wherein the third calculation values are calculated by converting a deviation of the first calculation values from the first average value into a percentage.

5. The method of claim 4, wherein the noise channel is set as a reception channel that has a third calculation value between 100% and 348%.

6. The method of claim 4, wherein calculating each of the third calculation values includes:
 calculating a first percentage value by subtracting 1 from a value obtained by dividing the first calculation value of each of the reception channels by the first average value;
 calculating a second percentage value by subtracting 1 from a value obtained by dividing the first average value by the first calculation value of each of the reception channels;
 determining each of the third calculation values by converting a greater of the first percentage value and the second percentage value into a percentage.

7. The method of claim 5, wherein the first average value is calculated by rounding a value to a first decimal place, and the third calculation values are calculated by rounding a value to a third decimal place.

8. The method of claim 1, wherein the maximum value of the noise channel before correction has a different sign from other values of the noise channel.

9. The method of claim 1, wherein the minimum value of the noise channel before correction has a different sign from other values of the noise channel.

10. The method of claim 1, wherein one of the maximum value or the minimum value of the noise channel is corrected such that a sign is switched.

11. The method of claim 10, wherein correcting the one of the maximum value or the minimum value of the noise channel includes:
 when the first value is greater than the second value, switching a sign of the maximum value of the noise channel to an opposite sign.

12. The method of claim 11, wherein subtracting the predetermined value from the values of the noise channel includes:
 when the first value is greater than the second value, subtracting a second average value of the noise channel from the values of the noise channel, which include a value obtained by switching a sign of the maximum value,
 wherein the second average value is calculated by rounding to a first decimal place.

13. The method of claim 10, wherein correcting one of the maximum value or the minimum value of the noise channel includes:
 when the first value is less than the second value, switching a sign of the minimum value of the noise channel to an opposite sign.

14. The method of claim 13, wherein subtracting the predetermined calculation value from the values of the noise channel includes:
 when the first value is less than the second value, subtracting a second average value of the noise channel from the values of the noise channel, which include a value obtained by switching a sign of the minimum value,
 wherein the second average value is calculated by rounding to a first decimal place.

15. The method of claim 1, further comprising:
 subtracting an average value of each of the reception channels, other than the noise channel, from the values of each of the reception channels other than the noise channel,
 wherein the average value is calculated by rounding to a first decimal place.

16. A noise reduction method of an input sensing part, the method comprising:
 calculating a first calculation value by subtracting a minimum value from a maximum value of values of a plurality of reception channels that corresponding to sensing electrodes of the input sensing part;
 calculating a first average value of those first calculation values of the reception channels that exclude a maximum first calculation value;
 calculating a deviation of the first calculation values from the first average value as third calculation values;
 detecting a reception channel with a maximum third calculation value as a noise channel;
 comparing a first value obtained by subtracting an average value of the noise channel from a maximum value of the noise channel with a second value obtained by subtracting a minimum value of the noise channel from the average value of the noise channel;
 switching a sign of the maximum value of the noise channel to an opposite sign, when the first value is greater than the second value;
 switching a sign of the minimum value of the noise channel to an opposite sign, when the first value is less than the second value; and
 subtracting a second average value of the noise channel from the values of the noise channel.

17. The method of claim 16, wherein the values of the noise channel include a value obtained by switching a sign of the maximum value of the noise channel or a value obtained by switching a sign of the minimum value of the noise channel, and
 wherein the first average value is calculated by rounding to a first decimal place, and the second average value is calculated by rounding to a first decimal place.

18. The method of claim 16, wherein calculating each of the third calculation values includes:
 calculating a first percentage value by subtracting 1 from a value obtained by dividing the first calculation value of each of the reception channels by the first average value;
 calculating a second percentage value by subtracting 1 from a value obtained by dividing the first average value by the first calculation value of each of the reception channels; and
 determining the third calculation value of each of the reception channels by converting a greater of the first percentage value or the second percentage value into a percentage, wherein the third calculation values are calculated by rounding to a third decimal place, and the noise channel is set as a reception channel that has a third calculation value of 100% or more.

19. The method of claim 16, further comprising:
subtracting an average value of each of the reception channels, other than the noise channel, from the values of each of the reception channels other than the noise channel,
wherein the average value is calculated by rounding to a first decimal place.

20. An electronic device comprising:
a display device for displaying images, where the display device comprises an input sensing part for sensing an external input,
wherein the input sensing part comprises:
a first calculation part that calculates a first calculation value by subtracting a minimum value from a maximum value of values of a plurality of reception channels that correspond to sensing electrodes of the input sensing part;
a second calculation part that calculates a first average value of those first average values of the reception channels that exclude a maximum first calculation value;
a third calculation part that calculates a deviation of the first calculation values of the reception channels from the first average value, as third calculation values;
a noise channel detection part that detects a reception channel that corresponds to a maximum third calculation value as a noise channel;
a correction part that corrects one of a maximum value or a minimum value of the noise channel based on a result of comparing a first value obtained by subtracting the first average value from the maximum value of the noise channel, with a second value obtained by subtracting the minimum value of the noise channel from the first average value; and
a noise reduction part that subtracts a second average value of the noise channel from the values of the noise channel.

* * * * *